US008442005B2

(12) United States Patent
Dutta et al.

(10) Patent No.: US 8,442,005 B2
(45) Date of Patent: *May 14, 2013

(54) SEAMLESS HANDOFF ACROSS HETEROGENEOUS ACCESS NETWORKS USING A HANDOFF CONTROLLER IN A SERVICE CONTROL POINT

(75) Inventors: Ashutosh Dutta, Bridgewater, NJ (US); Subir Das, Kendall Park, NJ (US); Donald R. Lukacs, Red Bank, NJ (US); Tao Zhang, Fort Lee, NJ (US); David C. Shrader, New York, NY (US); Raquel Morera Sempere, Morristown, NJ (US); Stephanie Demers, Westfield, NJ (US); Bryan J. Lyles, Bedminster, NJ (US); James Alfieri, Palmer Township, PA (US)

(73) Assignee: TTI Inventions C LLC, Wilmington, DE (US)

( * ) Notice: Subject to any disclaimer, the term of this patent is extended or adjusted under 35 U.S.C. 154(b) by 598 days.

This patent is subject to a terminal disclaimer.

(21) Appl. No.: 12/638,765

(22) Filed: Dec. 15, 2009

(65) Prior Publication Data

US 2010/0150110 A1 Jun. 17, 2010

Related U.S. Application Data

(63) Continuation of application No. 11/436,742, filed on May 18, 2006, now Pat. No. 7,664,501.

(60) Provisional application No. 60/682,276, filed on May 18, 2005, provisional application No. 60/714,625, filed on Sep. 7, 2005.

(51) Int. Cl.
*H04W 36/00* (2009.01)

(52) U.S. Cl.
USPC ........... 370/331; 455/436; 455/442; 455/445; 455/439; 455/456.5; 370/334; 370/351; 370/338; 370/328; 370/352

(58) Field of Classification Search ............... 455/456.5, 455/436, 428, 445, 439, 552.1; 370/331, 370/352, 493, 334, 351, 338
See application file for complete search history.

(56) References Cited

U.S. PATENT DOCUMENTS 6,662,017 B2   12/2003   McCann et al.
6,944,150 B1   9/2005   McConnell et al.
(Continued)

FOREIGN PATENT DOCUMENTS

WO   2006125085 A2   11/2006

OTHER PUBLICATIONS

Gupta, Vivek et al., "Media Independent Handover," IEEE 802.21 Working Group; Jan. 1, 2005; 30 pages.
(Continued)

*Primary Examiner* — Kiet Doan
*Assistant Examiner* — Michael T Vu
(74) *Attorney, Agent, or Firm* — Fitch, Even, Tabin & Flannery LLP

(57) ABSTRACT

In a telecommunications network in which a mobile handset is capable of communicating in both an IP domain and a non-IP domain, the handoff of an existing communications session between the mobile handset and a fixed user is facilitated by a handoff controller implemented in a service control point. The handoff controller implements different handoff methods depending on the status of the fixed user and the transition of the mobile user. Additionally 802.21 Media Independent Handover Function in conjunction with SIP is used to facilitate handover between IP and Non-IP points in the system.

28 Claims, 19 Drawing Sheets

U.S. PATENT DOCUMENTS

| | | | |
|---|---|---|---|
| 6,999,770 | B2 | 2/2006 | Hirsbrunner et al. |
| 7,031,280 | B2 | 4/2006 | Segal |
| 7,664,501 | B2 | 2/2010 | Dutta et al. |
| 2002/0147008 | A1 | 10/2002 | Kallio |
| 2003/0134638 | A1 | 7/2003 | Sundar et al. |
| 2005/0070288 | A1 | 3/2005 | Belkin et al. |
| 2006/0046714 | A1 | 3/2006 | Kalavade |
| 2006/0116127 | A1 | 6/2006 | Wilhoite et al. |
| 2006/0121916 | A1* | 6/2006 | Aborn et al. ............... 455/456.5 |
| 2006/0274759 | A1* | 12/2006 | Maeda .................... 370/395.52 |

OTHER PUBLICATIONS

Liu, Xiaoyu et al., "Initial Proposal to IEEE 802.21 from Samsung," IEEE 802.21 Working Group; Jan. 10, 2005; 42 pages.

Peretz Feder et al., "MIH Proposal," IEEE 802.21 Working Group; Jan. 17, 2005; 22 pages.

European Search Report from related European Patent Application No. 06770567.3; Mar. 29, 2012; 6 pages.

11.1.4.2 3GPP -> 802.x Handovers (Network Initiated and Network Controlled); Media Independent Handover, 21-05-0240-01-0000-joint-harmonized-mih-proposal-draft-text.doc, May 3, 2005; 12 pages.

2.8.2.1.2 MIH_LLEVENT Primitive Group; Media Independent Handover, 21-05-0253-02-0000-joint-harmonized-contribution.doc, May 4, 2005; 20 pages.

PCT Search Report from related International Patent Application No. PCT/US2006/019246; Jul. 15, 2008; 3 pages.

Communication pursuant to Article 94(3) EPC from related European Patent Application No. 06770567.3; dated Apr. 13, 2012; 10 pages.

Official Notice of Rejection from related Japanese Patent Application No. 2008-512505 dated Jun. 18, 2010; 6 pages including English translation.

* cited by examiner

| Scenario | Fixed User | Handoff | Handback |
|---|---|---|---|
| 1 | IP | IP→CDMA | CDMA→IP |
| 2 | IP | CDMA→IP | IP→CDMA |
| 3 | CDMA/PSTN | CDMA→IP | IP→CDMA |
| 4 | CDMA/PSTN | IP→CDMA | CDMA→IP |

FIG. 2

SEAMLESS HANDOFF ACROSS HETEROGENEOUS ACCESS NETWORKS USING A HANDOFF CONTROLLER IN A SERVICE CONTROL POINT

CROSS-REFERENCE TO RELATED APPLICATION

This application is a continuation of prior application Ser. No. 11/436,742, filed on May 18, 2006, now U.S. Pat. No. 7,664,501 B2, issued on Feb. 16, 2010, which claims the benefit of U.S. Provisional Patent Application No. 60/682,276 filed on May 18, 2005 and U.S. Provisional Patent Application No. 60/714,625 filed on Sep. 7, 2005, the disclosures of which are hereby incorporated herein by reference in their entirety.

FIELD OF THE INVENTION

This invention relates generally to the handoff of a communication session with a mobile user as the mobile user moves from one type of access network to another, such as moving from a Wireless Fidelity (WiFi) or WiMAX network to a standard mobile cellular network such as CDMA or GSM networks. More specifically, this invention relates to a method and mechanism using a service control point ("SCP") implementing a handover controller in order to provide seamless handoff to a mobile user using a "combo-phone" (e.g., a phone capable of operating in both a WiFi or WiMAX network and a CDMA or GSM network) as the user moves across such heterogeneous access networks in both the Internet Protocol ("IP") and non-IP domains.

DESCRIPTION OF THE BACKGROUND

A number of different mobile access networks have been developed and are deployed around the world. Around the world, the primary mobile access networks for cellular telephony are based on one of two families of standard communications protocols: Code Division Multiple Access (CDMA) and Global System for Mobile Communications ("GSM"). Cellular networks operating in one of these two standards provide telecommunication services to the users of mobile handsets or "cell-phones" in most countries in the world. Cellphones that operate on one or both of these types of networks are well-known in the art.

WiFi is another type of mobile access network that has been implemented in the IP domain. In WiFi networks, access points or "hot-spots" provide user of mobile computers, PDA's and WiFi compatible telephony handsets with the ability to connect to the Internet and communicate with other users using data transfers such as e-mail or instant messaging ("1M") or voice over IP ("VoIP") protocols. WiFi began as a method and system for enabling users to create wireless local area networks ("wireless LAN") in order to wirelessly communicate with one another such as computers within a home or office. The most widely used wireless LAN technology is based on the IEEE 802.11 protocol which is known as WiFi. WiFi has increasingly become a method for mobile users to communicate with the Internet and make and receive VoIP calls. There are various versions of the IEEE 802.11 protocol such as 802.11(a), 802.11(b) and 802.11(g) in use. WiFi can transmit data up to approximately 320 feet indoors and 400 feet outdoors at speeds up to 54 million bits per second ("mbps").

Worldwide Interoperability for Microwave Access ("WiMAX") is a more recent wireless LAN communication protocol known as 802.16. WiMAX can transmit data up to approximately 70 mbps with a radius of approximately 30 miles. With such a communication radius a user could travel a significant distance and remain within reach of the access point and far fewer nodes would be needed to provide mobile communications to a user over a large area.

Recently, it has been proposed to have mobile handsets or cellphones that can operate in both the traditional cellular networks based on the various CDMA and GSM standards while also enabling a user to communicate with the Internet and place VoIP calls through WiFi and/or WiMAX access points. As ubiquitous access becomes more prevalent, a mobile user equipped with a terminal or handset with multi-mode capabilities can move between heterogeneous access networks such as Bluetooth, 802.11X, WiMAX, CDMA1XRTT, IPv6 and cellular (CDMA, GSM) networks. As the mobile moves between networks, the signaling and radio access networks will be different in each access network. While there has been some prior work to take care of seamless handoff when a user moves between two IP networks with different access technologies, there has been little work on providing a seamless handoff when a mobile moves between IP and non-IP networks involving different radio access networks. For example a user may be equipped with a combo-phone that can be connected to both 802.11 type IP networks and non-IP cellular networks such as CDMA or GSM. Based on user's preference and position (e.g. at home or in the car), a "combo-phone" can actively communicate via either interface. However it is a key challenge to handover the existing session seamlessly from one interface to another interface as the mobile moves in and out of the network of a specific kind.

Different access technologies have different mechanisms to attach to each different access network. Each network needs certain specific ways to obtain network resources (e.g. configuration parameters) and it takes different amounts of time to provide such network resources. It is not always possible to pre-configure all network information. Security requirements such as authentication of users are different for different access networks. Intra-technology mobility management and/or roaming vary between access networks. Supporting seamless mobility between heterogeneous networks is a challenging task since each access network may have different mobility, Quality of Service (QoS) and security requirements. Moreover, interactive applications such as VoIP and streaming media have stringent performance requirements on end-to-end delay and packet loss. The handover process places additional stress on these performance criteria by introducing delays due to discovery, configuration and binding update procedures associated with mobility events. Performance can also be tied to the specific access networks and protocols that are used for network access. Movement between two different administrative domains raise additional challenges since a mobile handset will need to re-establish authentication and authorization in the new domain.

Currently there are several initiatives to optimize mobility across heterogeneous networks. The MOBOPTS working group within the Internet Research Task Force (IRTF) and the Detecting Network Attachment (DNA) group within the IETF are investing ways to support handover by using appropriate triggers from the lower layers. These initiatives deal only with issues of mobility between IP networks and do not provide solutions for mobility between heterogeneous (e.g., IP and Non-IP) networks.

The IEEE 802.21 working group has created a framework that defines a Media Independent Handover Function (MIHF)

to facilitate the handover across heterogeneous access networks and help mobile users to experience better performance during seamless handover. This MIHF provides assistance to underlying mobility management approaches by allowing information about neighboring networks, link specific events and commands that are necessary during the handover process. The goal of IEEE 802.21 is to facilitate mobility management protocols such that the following handover requirements are fulfilled. One goal of IEEE 802.21 is to provide service continuity thereby minimizing the data loss and break time without user intervention. IEEE 802.21 supports applications of different tolerance characteristics. IEEE 802.21 provides a means of obtaining QoS information of the neighboring network. IEEE 802.21 provides a means of network discovery and selection. Network information could include information such as link type, link identifier, link availability, link quality. Selection of an appropriate handoff network can be based on required QoS, cost, user preference, etc. Power management can be accomplished by providing real-time link status. IEEE 802.21 does not provide a complete handover solution, but rather, is only a means to assist handover implementations.

The MIHF of 802.21 provides abstracted services to higher layers by means of a unified interface. This unified interface exposes service primitives that are independent of the access technology. The MIHF can communicate with access specific lower layer Media Access Control ("MAC") and Physical Layer ("PHY") components including those using IEEE 802.16, 802.11 and cellular protocols. The MIHF defines three different services: Media Independent Event Service (MIES), Media Independent Command Service (MICS) and Media Independent Information Service (MIIS).

Media Independent Event Service provides services to the upper layers by reporting both local and remote events. Local events take place within a client whereas remote events take place in the network. The event model works according to a subscription and notification procedure. An MIH user (typically upper layer protocols) registers to the lower layers for a certain set of events and is notified as those events take place. In the case of local events, information propagates upward from the MAC layer to the MIH layer and then to the upper layers. In the case of remote events, information may propagate from the MIH or Layer 3 Mobility Protocol (L3MP) in one stack to the MIH or L3MP in a remote stack. Some of the common events defined include "Link Up", "Link Down", "Link Parameters Change", "Link Going Down", "L2 Handover Imminent" among others. As the upper layer is notified about certain events it makes use of the command service to control links to switch over to a new point of attachment.

Media Independent Command Service (MICS) provides higher layers with MICS primitives to control the function of the lower layers. MICS commands are used to gather information about the status of the links, as well as to execute higher layer mobility and connectivity decisions from the lower layers. MIH commands can be both local and remote. Some examples of MICS commands are MIH Poll, MIH Scan, MIH Configure and MIH Switch. The commands instruct an MIH device to poll connected links to learn their most recent status, to scan for newly discovered links, to configure new links and to switch between available links.

Media Independent Information Service defines information elements and corresponding query-response mechanism to allow an MIHF entity to discover and obtain information relating to nearby networks. The MIIS provides access to both static and dynamic information, including the names and providers of neighboring networks as well as channel information, MAC addresses, security information and other information about higher layer services helpful to handover decisions. This information can be made available via both lower and upper layers. In some cases certain layer 2 information may not be available or sufficient to make intelligent handover decisions. In such scenarios, higher-layer services may be consulted to assist in the mobility decision-making process. The MIIS specifies a common way of representing information by using standard formats such as XML (eXternal Markup Language) and TLV (Type-Length-Value). Having a higher layer mechanism to obtain the information about the neighboring networks of different access technologies alleviates the need for a specific access-dependent discovery method.

It is, therefore, desirable to provide a method and mechanism for providing a seamless handoff when a mobile user using a mobile handset moves from an IP network such as a WiFi network to a non-IP cellular network such as a CDMA or GSM network or vice versa.

It is desirable to address the issues of differing attachment mechanisms, allocation of network resources, timing, security and roaming when a mobile user transfers from using an IP network to a non-IP network or vice versa thereby avoiding packet loss.

It is desirable to take advantage of the MIHF of the emerging IEEE 802.21 standard in order to implement seamless handoff between heterogeneous networks.

SUMMARY OF THE INVENTION

This specific invention has come up with solution for seamless mobility in four different scenarios. These scenarios are based on the type of movement of the user and the position of the corresponding user the mobile is communicating with. In contrast to prior art solutions that handle handoffs between IP networks, handoffs between IP and non-IP (cellular) networks involve more complex flows, more interaction between networking elements and require different handoff algorithms. This invention proposes flows involving Session Initiation Protocol ("SIP") to ANSI-41 and SIP to GSM mappings that will help provide the seamless handoff. Although applied explicitly herein as using WiFi to be the RAN (Radio Access Network) for IP networks, the RAN can always be other broadband connection such as WiMAX. The method also proposes the use of primitives defined in the 802.21 standards to take care of handoff between IP and Non-IP networks while 802.21 standard does not mandate this type of handoff. The present method is mobile assisted but network controlled. A mobile handset that is likely to move can send the handover imminent signal to the SCP (Service Control Point) which in turn will control the handoff by setting up the communication between other networking elements in the network such as serving MSC (Mobile Switching Center) and target MSC. A combination of the SCP and the Media Gateway Control ("MGC") and Media Gateway ("MGW") is the "WiFi MSC" that can act like a serving MSC or target MSC based on the mobile's movement pattern (i.e. IP to Cell or Cell to IP). Certain ANSI-41 or GSM related information is carried as part of SIP signaling. Standard SIP messages such as REFER, INVITE, SUBSCRIBE, NOTIFY, a SIP Proxy, and B2BUA are used. These messages carry the information related to IEEE 802.21 primitives, ANSI-41 and GSM related information in the body of these messages. The event notification package between the mobile and the SCP are taken advantage of to assist the handoff from an IP network to a cellular network and vice versa.

A method for using a handoff controller in the network for handing off a communication session of a mobile user from a first network to and a second network wherein the first network is either an IP network or a cellular network and the second network is the other type and wherein a mobile handset operated by the mobile user is in communication with a handset operated by a fixed user is provided. The handoff controller sends messages to the mobile handset instructing the mobile handset to monitor one or more predetermined characteristics of the air interface between the mobile user and the first network. The mobile handset responds to the handoff controller when one or more predetermined characteristics have been met. The handoff controller then collects information regarding the available connection points in the second network and determines in the identification of a connection point in the second network. Messages are sent from the handoff controller to the mobile handset identifying the connection point in the second network and a communication session between the mobile user of the mobile handset and the second network is established and the mobile user of the mobile handset and the fixed user. The handoff controller can reside in the SCP.

BRIEF DESCRIPTION OF THE DRAWINGS

FIG. 2 is a diagram depicting the various handover scenarios.

DETAILED DESCRIPTION OF THE INVENTION

Figure 1:
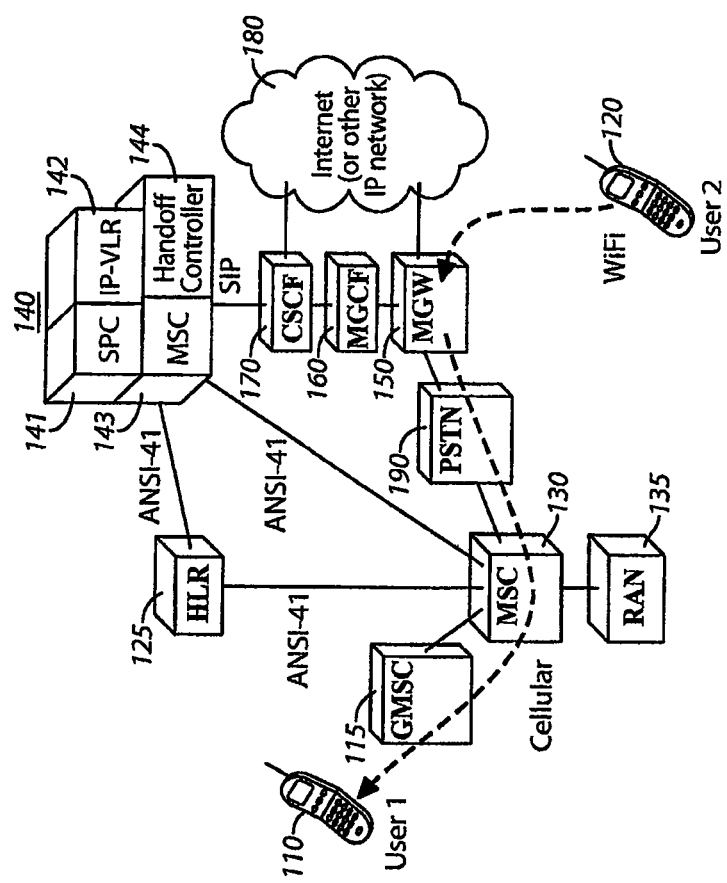
FIG. 1 depicts the network architecture of a telecommunication system in which the present invention is implemented.

FIG. 1 depicts the architecture of a telecommunication system for use in accordance with the method of the present invention. User 1 is referred to as the "fixed" or "static" user, i.e., the user that is not currently transitioning from an IP to a non-IP network. User 1 could be connected to the network via a wireline or wireless connection in either the IP domain (i.e., DSL, WiFi, WiMAX, Cable modem) or non-IP domain (i.e., PSTN, CDMA cellular, GSM cellular etc.). User 1 may be connected via a Mobile Switching Center ("MSC") which could be connected to a Gateway MSC ("GMSC") 115. Radio Access Networks 135 are also part of the cellular network providing the final wireless link between and MSC and the handset 110 used by User 1. User 2 is the mobile user that will be transitioning between IP and non-IP networks in the examples below. User 2 and associated mobile handset 120, also referred to as a "combo phone" may be connected via an IP connection such as WiFi, WiMAX or other wireless IP protocol. Additionally the "combo phone" also has an interface that can be used to connect to a CDMA or GSM network. The combo phone thus has the ability to switch back and forth between cellular network and IP network. Such a connection would be routed through the Media Gateway ("MGW") 120 via the Public Switched Telephone Network ("PSTN") 190 to an MSC 130. Media Gateway Control Function ("MGCF" or "MGC") 160 is closely related to the Media Gateway and together provide the interface between IP and non-IP networks. Call Session Control Function ("CSCF") 170 is a well-known component of IP networks such as IMS (IP Multimedia Subsystem) of 3rd Generation Partnership Project ("3GPP") networks and its function remains unchanged in the present invention. Internet 180 is the ubiquitous packet switched network of routers or other similar IP network whether operating in IPv4, IPv6 or other protocol.

Service Control Point ("SCP") 140 is call control software and associated servers and other hardware that implements the following functions: SCP 140 implements the functionality of a standard Service Control Point 141 such as that provided by the Telcordia® SCP. Additionally the SCP 140 includes a handoff (or handover) controller 144 which is further described below and in FIG. 9. SCP 140 also may include an Internet Protocol-Vesting Location Register ("IP-VLR") which is needed to maintain a record for IP mobility purposes. SCP 140 also contains a virtual MSC 143 which acts as a target or serving MSC in the various mobility scenarios described below. The MSC 143 is in communication with Home Location Register ("HLR") 125 which is in communication with actual MSC such as MSC 130.

Referring to FIG. 2, the present invention provides for a method and mechanism to provide seamless mobility in four different scenarios. These scenarios are based on the type of movement of the user and the position of the corresponding user with whom the mobile is communicating. In the first two scenarios the fixed user is operating in an IP network and may be connected via WiFi, WiMAX, DSL, cable modem or some other type of IP access network and node. In the first scenario the mobile user is transitioning from being connected to an IP network to a cellular network ("Scenario 1") 210. In the second scenario the mobile user is moving from the CDMA domain to an IP domain ("Scenario 2") 220. In the other two scenarios the fixed user is connected to a cellular network such as a CDMA or GSM network or the PSTN. The fixed user may also be the mobile user in a future handoff and in a special scenario both users could be mobile. In scenario three the mobile user is moving from an IP network to a cellular network ("Scenario 3") 230. In scenario 4 the mobile user is moving from a cellular network (CDMA or GSM) to an IP network such as WiFi while the fixed user is attached to a cellular network ("Scenario 4") 240. Each of the scenarios will now be described one at a time.

Figure 3A:
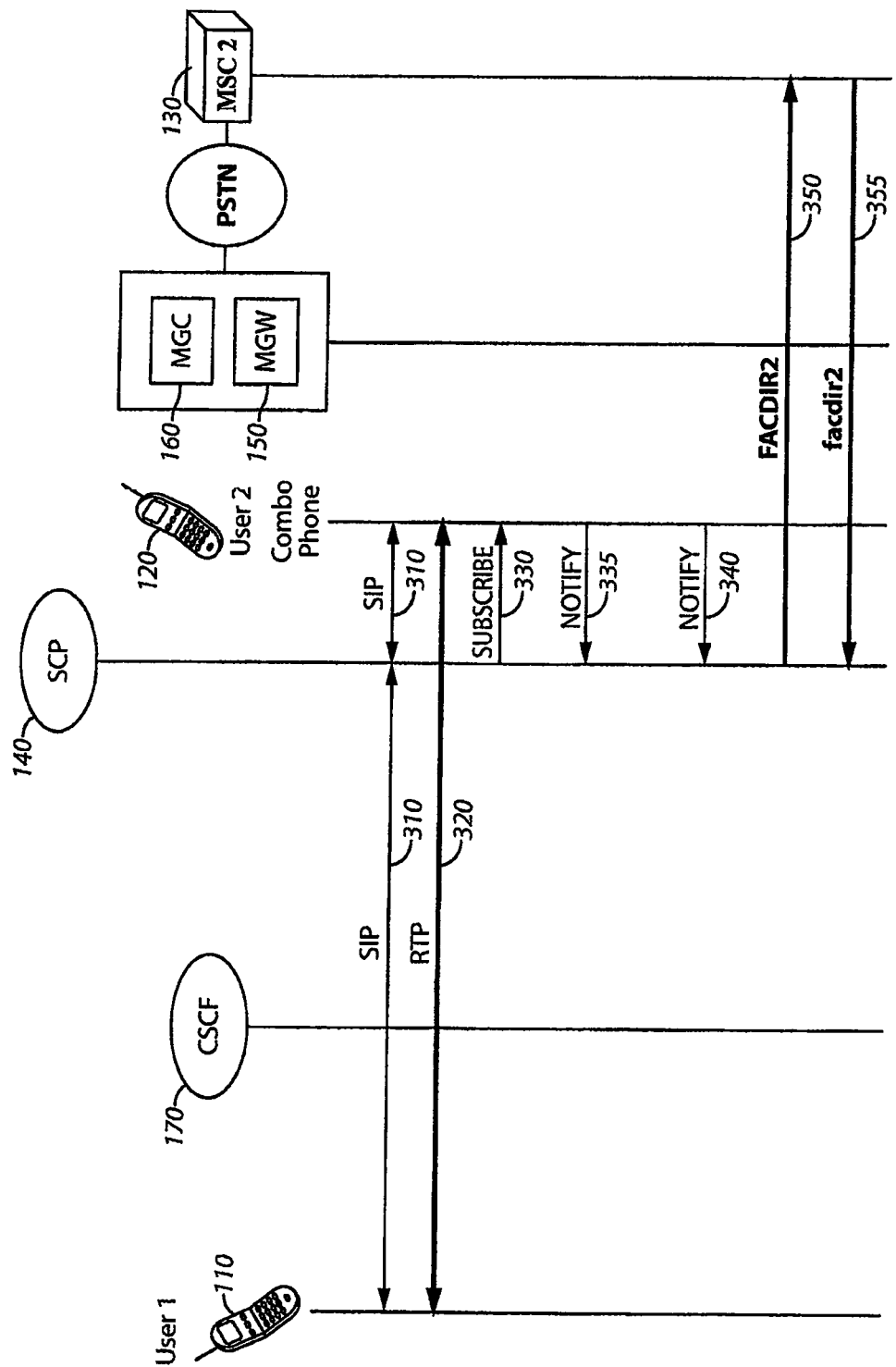
FIGS. 3A and 3B are diagrams depicting handoff flow in scenario 1 wherein the fixed user is in the IP domain and the mobile user transitions from the IP domain to the cellular domain.
Figure 3B:
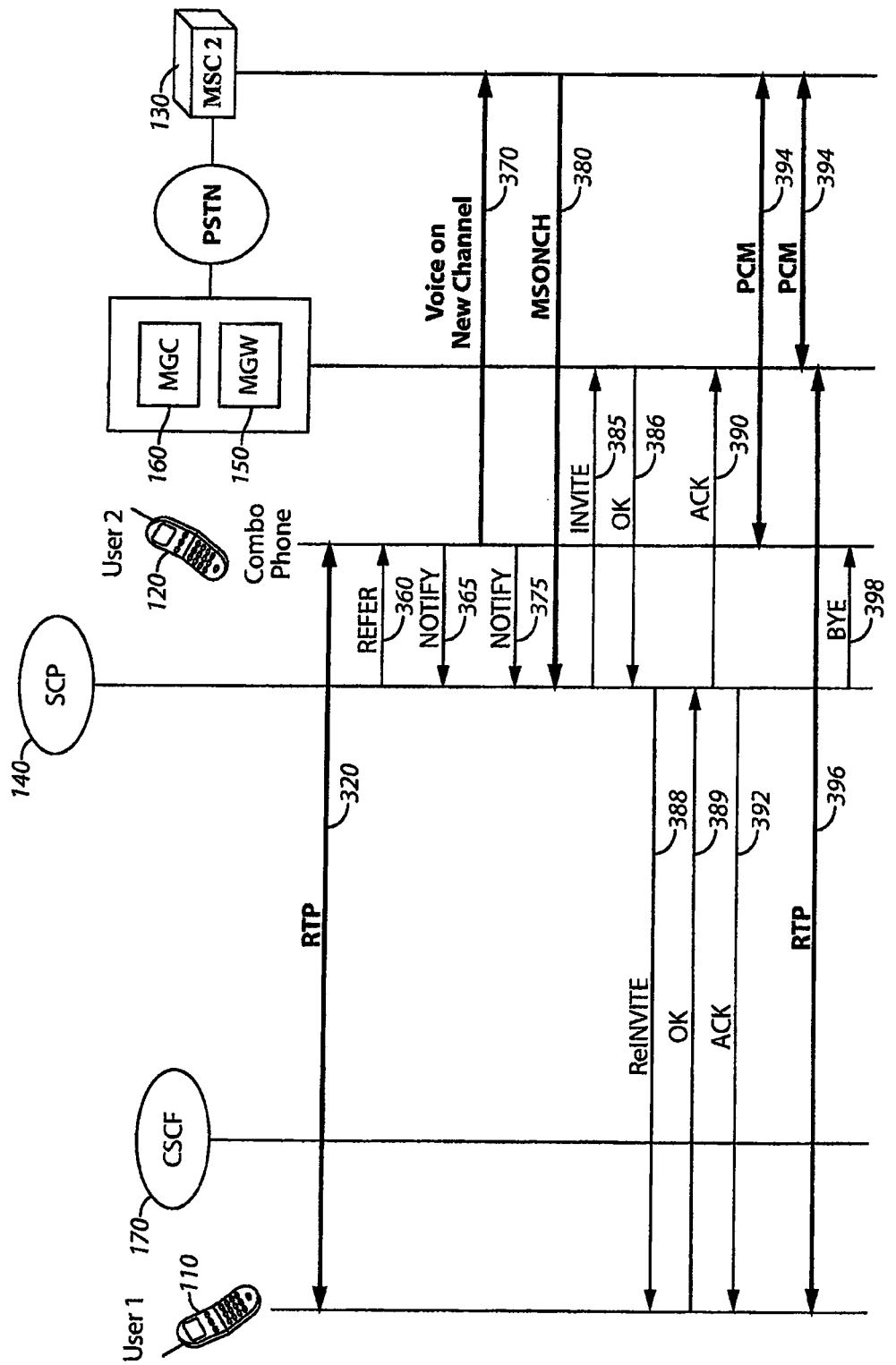

FIGS. 3A and 3B depict Scenario 1. In Scenario 1 the fixed user (User 1) and the mobile user (User 2) have initiated a standard Real-time Transport Protocol ("RTP") session using standard Session Initiation Protocol ("SIP") messaging at step 310. User 1 and User 2 then communicate with one another using RTP at step 320. At step 330 SCP 140 sends a SIP SUBSCRIBE message to the mobile handset 120 of User 2 to prompt User 2 to notify the SCP when a certain event occurs—for example, when the signal-to-noise ratio for the WiFi radio interface falls below a certain predetermined threshold number. Prior to the use of SUBSCRIBE message here and elsewhere in this specification, the mobile handset has sent a SIP REGISTER message to the SCP to make itself known to the SCP and its current location. The use of these SIP REGISTER messages is not shown but is assumed in all appropriate cases. User 2 acknowledges the inquiry from the SCP with a SIP NOTIFY message at step 335. When User 2 identifies that the predetermined event has occurred User 2 sends a SIP NOTIFY message to SCP 140 at step 340. SCP 140 then selects the target MSC which will be used to service User 2. At step 350 the SCP notifies the selected target MSC ("MSC 2") using an ANSI-41 FACDIR2 message described in greater detail below. MSC 2 acknowledges the selection and includes channel information by returning a "facdir2" response message at step 355.

FIG. 3B depicts the continuation of the handoff process for Scenario 1. Existing RTP session 320 exists between User 1 and User 2. At step 360 SCP 140 sends a SIP REFER message to the mobile handset 120 used by User 2 which is the handoff order. The mobile handset used by User 2 acknowledges receipt of the handoff order by returning a SIP NOTIFY message to the SCP at step 365. At step 370 the mobile handset of User 2 sends an ANSI-41 'voice on new channel' message to the target MSC, i.e., MSC 2. At step 375 User 2 also sends a SIP NOTIFY message to SCP 140 notifying the SCP that User 2 has alerted MSC 2 to the handoff. MSC 2 130 then sends an ANSI-41 MSONCH message to the SCP at step 380. SCP 140 sends a SIP INVITE message to the MGW/MGC 150/160 at step 385 that requests permission to initiate an RTP session between User 1 and the MGW. At step 386 the MGW/MGC returns a SIP OK message to the SCP if it agrees to the session. At step 388, the SCP sends a SIP ReINVITE message to User 1 to re-initiate the RTP session. User 1 sends a SIP OK message back to the SCP at step 389. The SCP then sends SIP ACK ("ACKNOWLEDGE") message to both the MGW and User 1 at steps 390 and 392 respectively in order to complete the initiation of the RTP session between User 1 and the MGW. At step 394 User 2 now communicates with the MGW through MSC 2 and the PSTN using Pulse Code Modulation ("PCM"). User 1 communicates with the MGW through the SIP initiated RTP session at step 396. Thus, the transfer of User 2 from the original IP based network in which it was communicating directly with User 1 in an RTP session to a cellular network in which it communicates with an CDMA based MSC is complete. The SCP 140 then sends a SIP BYE message to User 2 and the handoff is complete.

Communication between User 1 and User 2 now occurs in the following manner. User 2 is in wireless communication with a base station ("BS") forming part of a RAN connected to MSC 2 which is connected through the PSTN to the MGW. The MGW is in an RTP session with User 1. MGW is responsible for translating the RTP based session into a PCM based signal for transfer to User 2 and vice versa.

Figure 4:
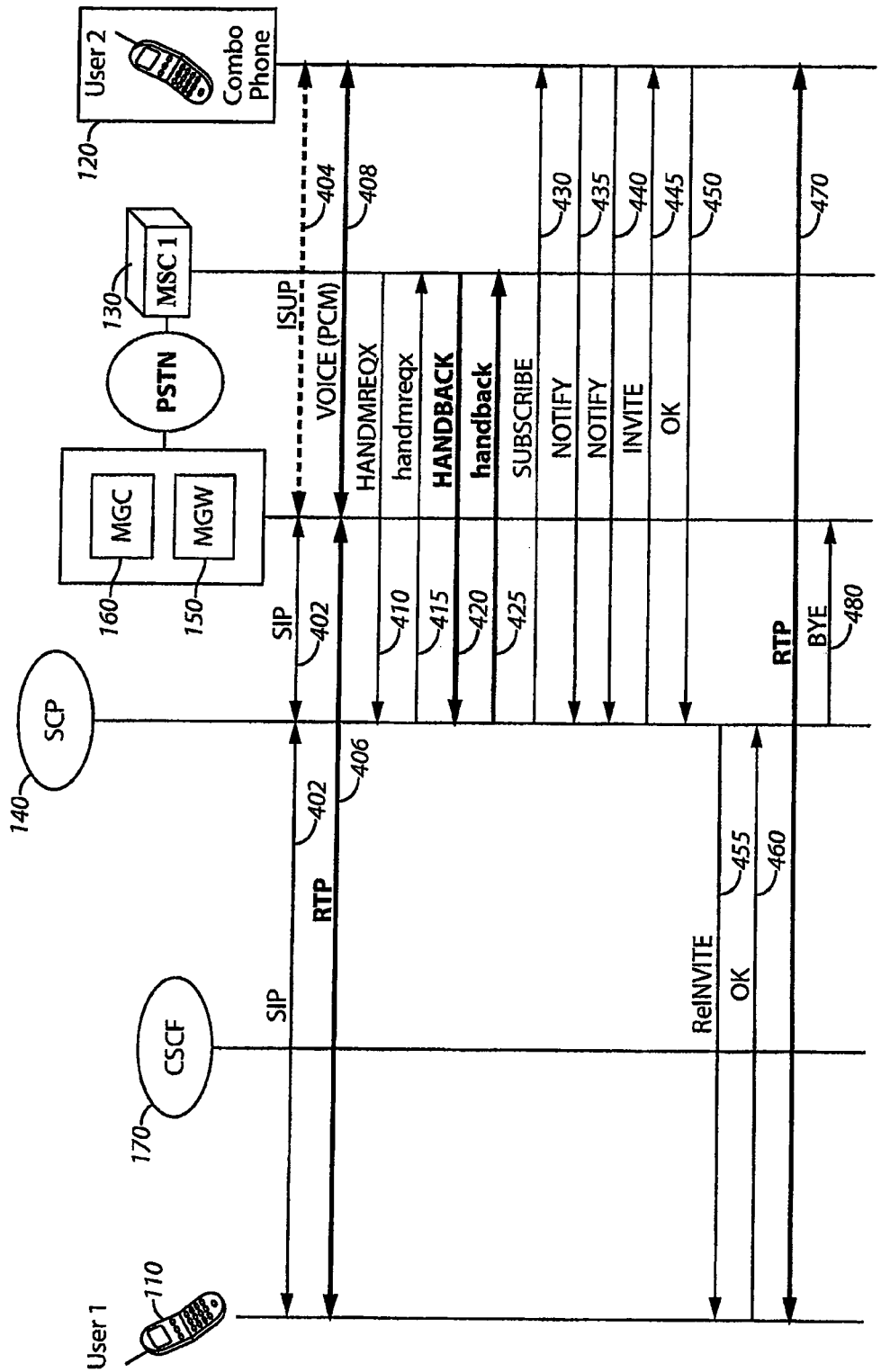
FIG. 4 is a diagram depicting handoff flow in scenario 2 wherein the fixed user is in the IP domain and the mobile user transitions from the cellular domain to the IP domain.

In Scenario 2 depicted in FIG. 4 User 1 remains in the IP domain connected to the Internet via a WiFi, WiMAX, DSL or other type of IP based connection. User 2 is transferring from the cellular domain to the IP domain. The original call is set-up using a SIP initiated (step 402) RTP session (406) between the MGW and User 1 and an ISUP initiated (step 404) PCM based session (408) between User 2 and the MGW through MSC 1 which is the serving MSC. MSC 1 sends an ANSI-41 HANDMREQX message to SCP 140 serving MSC 1 at step 410 in order to initiate the handoff. MSC 1 responds to the SCP with an ANSI-41 "handmreqx" message at step 415. MSC 1 selects the target MSC (i.e., the location of the Internet connection to which it will be connected) and notifies the SCP of this through an ANSI-41 HANDBACK message at step 420. At step 425 the SCP returns an ANSI-41 "handback" message to the MSC 1. At step 430 the SCP sends a SIP SUBSCRIBE message to the mobile handset of User 2 in order to instruct the mobile handset to monitor the quality of its air interface with the RAN connected to the MSC. User 2 responds with a SIP NOTIFY message at step 435. The mobile handset of User 2 monitors the characteristics of the call and upon one or more parameters reaching a predetermined threshold MSC 1 sends a SIP NOTIFY message to the SCP at step 440. In response, the SCP sends a SIP INVITE message to User 2 at step 445 in order to initiate an RTP session between User 2 and User 1. User 2 responds with SIP OK message at step 450. At step 455 SCP 140 sends a SIP ReINVITE message to User 1 and User 1 responds with a SIP OK message at step 460. At step 470 the RTP session between User 1 and User 2 has been established. At step 480 the SCP sends a SIP BYE message to the MGW notifying the MGW that the handoff has been completed and the MGW can release the call session.

Figure 5:
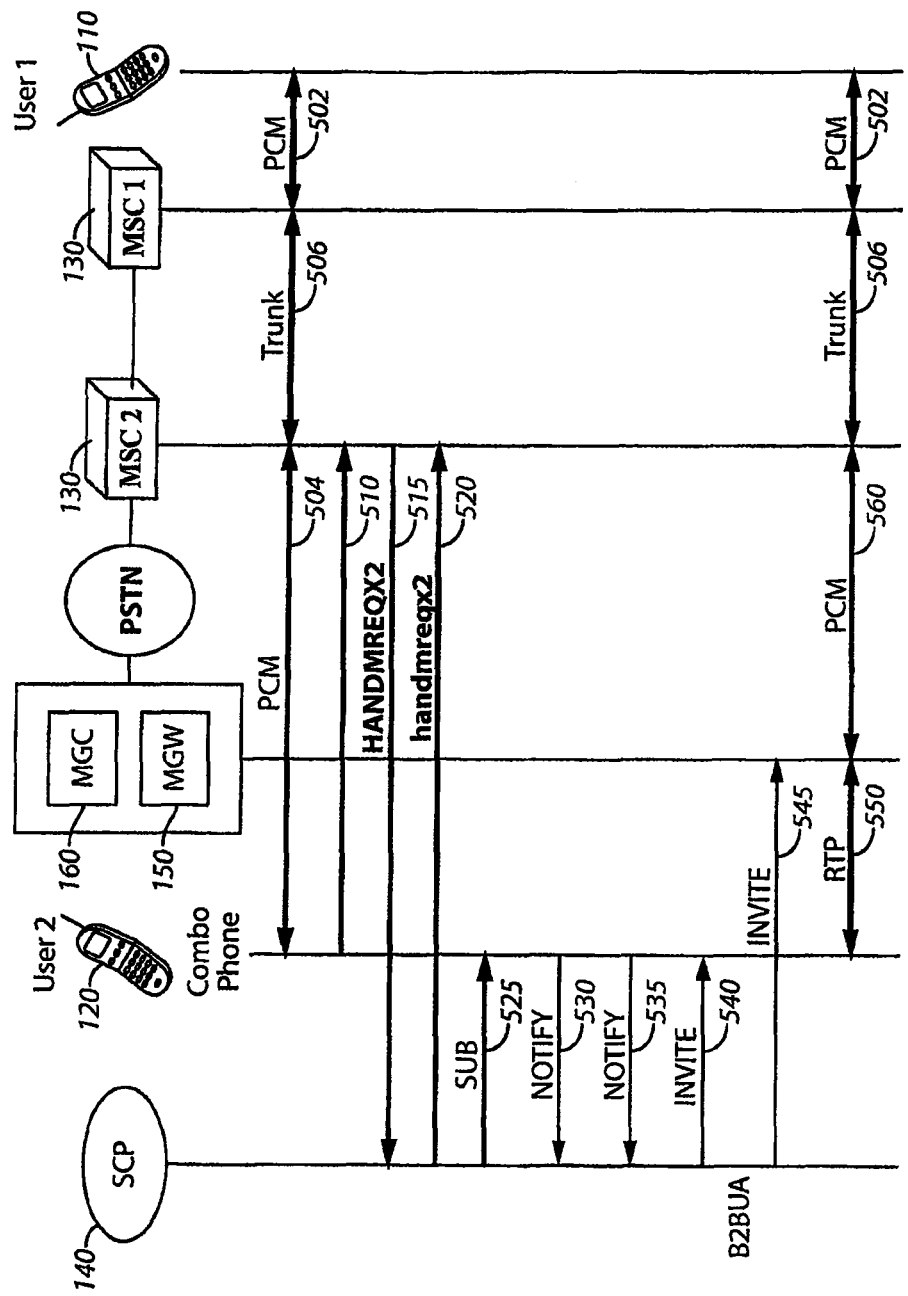
FIG. 5 is a diagram depicting handoff flow in scenario 3 wherein the fixed user is in the cellular domain and the mobile user transitions from the cellular domain to the IP domain.

Referring to FIG. 5, the handoff flow for Scenario 3 can be seen. In Scenario 3 User 1 remains statically connected via a PCM cellular interface to MSC 1 (502) initiated in the well-known manner. User 2 transfers from a PCM based connection with MSC 2 (504) to an RTP based session with the MGW. In the original cellular call MSC 1 and MSC 2 are connected via a trunk line (506). At step 510 User 2 sends an IS-95/IS-2000 measurement report (R-CQICH) to MSC 2 notifying MSC 2 of the target MSC with which it may communicate after handoff. The target MSC in this case is the virtual MSC, i.e., the MGW. At step 515 MSC 2 sends an ANSI-41 "HANDMREQX2" in order to request the handover. SCP 140 returns an ANSI-41 "handmreqx2" to MSC 2 at step 520. SCP 140 then begins the process of initiating an RTP session between User 2 and the MGW by sending a SIP SUBSCRIBE message to the mobile handset of User 2 at step 525. At step 530 User 2 sends a SIP NOTIFY message to the SCP. User 2 monitors the air interface and when the interface between it and the base station connected to MSC 2 deteriorates below a certain predetermined threshold it sends a SIP NOTIFY message to SCP 140 at step 535. At step 540 the SCP sends a SIP INVITE message to User 2 requesting the initiation of a SIP session between it and the MGW. At step 545 a similar INVITE request is sent from the SCP to the MGW requesting the initiation of a SIP session between the MGW and User 2. At step 550 the RTP session has been established. The communication session between User 1 and User 2 now occurs along the following path. User 1 continues to communicate with MSC 1 through a PCM cellular call 502. MSC 1 continues to communicate with MSC 2 through trunk line 506. MSC 2 communicated with the MGW through the PSTN in a PCM session 560. The final link between User 1 and User 2 is the RTP based IP session 550 between the MGW and User 2 through the WiFi, WiMAX, or other IP connection to which User 2 is connected.

Figure 6A:
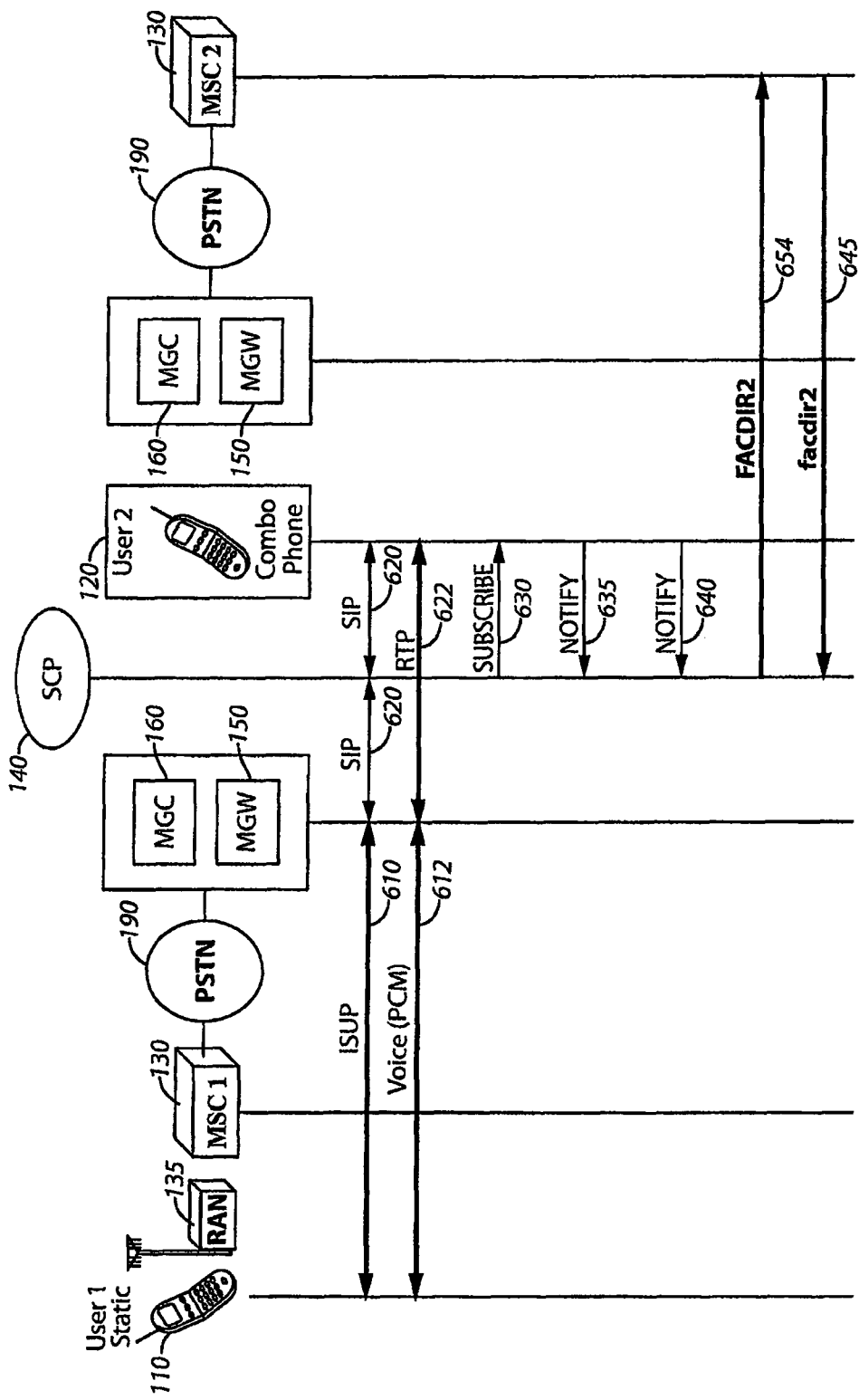
FIGS. 6A and 6B are diagrams depicting handoff flow in scenario 4 wherein the fixed user is in the cellular domain and the mobile user transitions from the cellular domain to the IP domain.
Figure 6B:
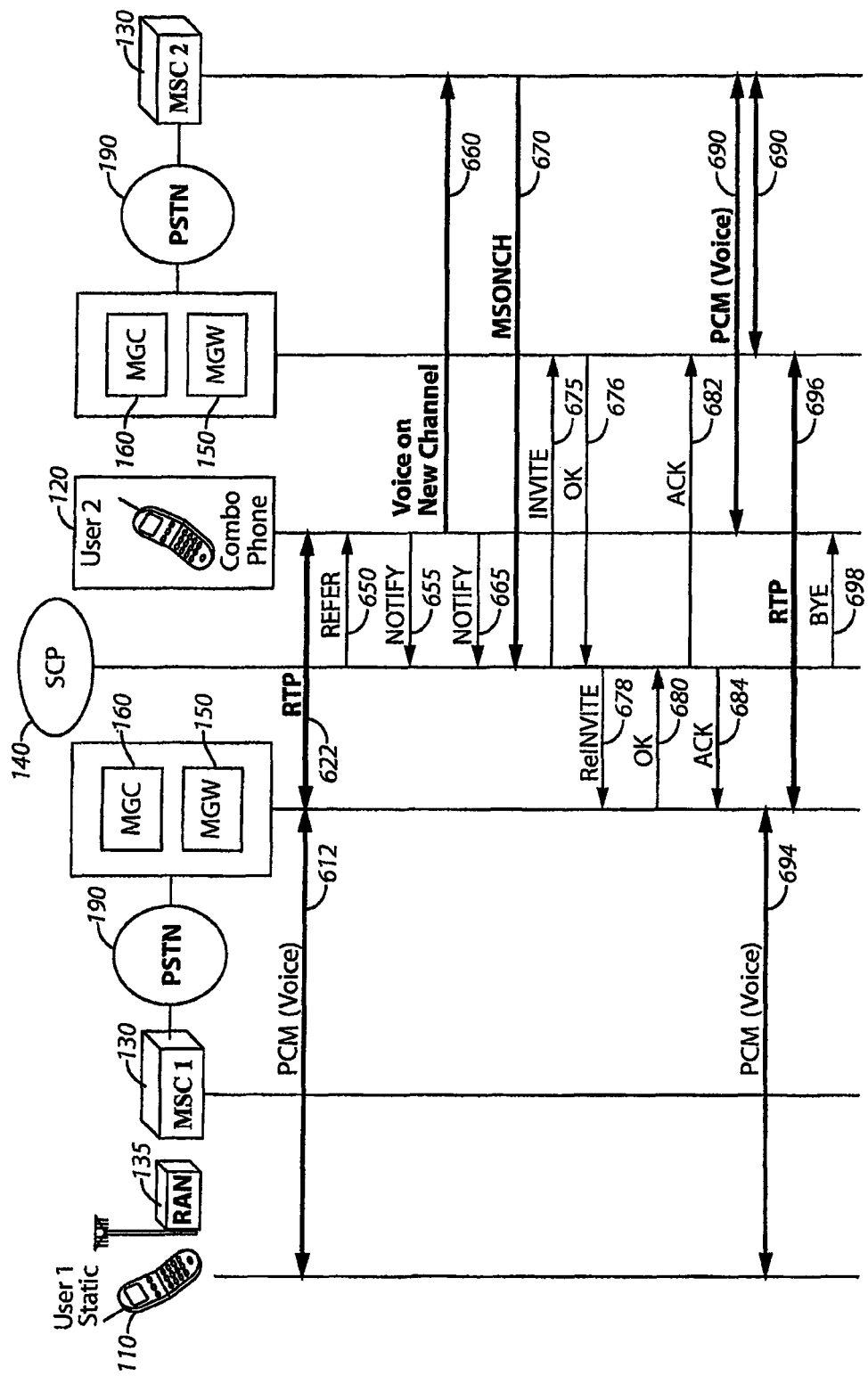

FIGS. 6A and 6B depict the handoff flow when User 2 transitions from an IP network to a cellular network while User 1 remains statically connected to a cellular network. The original call is originated by ISUP commands 610 between User 1, MSC 1 and the MGW which sets up a PCM based call between these elements at 612. SIP commands 620 between SCP 140 and the MGW and User 2 initiates an RTP based session 622 between User 2 and MGW. In order to initiate the transition, SCP 140 sends a SIP SUBSCRIBE message to the mobile handset of User 2 at step 630 requesting User 2 to monitor the air interface characteristics of its WiFi connection. At step 635 User 2 sends a SIP NOTIFY message to SCP 140 notifying the SCP that it is monitoring the air interface characteristics of its connection to the WiFi or WiMAX access point to which it is connected. Once a predetermined air interface characteristic such as signal-to-noise ratio is detected, User 2 sends a SIP NOTIFY message to the SCP at step 640 to notify the SCP that the handoff should begin. SCP 140 then sends an ANSI-41 "FACDIR2" message to the target MSC (MSC 2) which will be used to communicate with User 2. Target MSC 2 returns an ANSI-41 "facdir2" message to SCP 140.

Call flow for Scenario 4 continues in FIG. 6B where the original call is denoted by PCM based session between the MGW and User 1 through MSC 1/PSTN and the RTP based session between the MGW and User 2. At step 650 the SCP sends a SIP REFER message to User 2 providing the handoff order to User 2. User 2 returns a SIP NOTIFY message to the SCP at step 655. At step 660 User 2 sends an ANSI-41 based "Voice on New Channel" command to MSC 2 alerting MSC 2 that it would like to initiate cellular service through MSC 2. User 2 also sends a SIP NOTIFY command to SCP 140 at step 665 in order to notify SCP 140 that it has initiated service with MSC 2. MSC 2 sends an ANSI-41 MSONCH (MS ON CHANNEL) command to SCP 140 at step 670 thereby notifying the SCP that MSC 2 is now communicating with User 2. SCP 140 must now set up an RTP session between the MGW in communication with MSC 1 and the MGW in communication with MSC 2. At step 675 SCP 140 sends a SIP INVITE message to the MGW in communication with MSC 2/User 2 and that MGW sends a SIP OK message in return at step 676. At step 678 SCP 140 sends a SIP ReINVITE message to the MGW in communication with MSC 1/User 1 and that MGW returns a SIP OK message at step 680. At steps 682 and 684 the SCP 140 sends a SIP ACKNOWLEDGE message to each of the MGWs respectively thereby establishing an RTP based session between the two MGWs. With the session now transferred, communication between User 1 and User 2 occurs through a PCM based session 690 between User 2 and its MGW through MSC 2 continuing in an RTP session 696 between the MGW in communication with User 2 and the MGW in communication with User 1 and finally from the MGW in communication with User 1 through a PCM based session 694 from that MGW to User 1 through MSC 1. Upon completion of the handoff SCP 140 sends a BYE message to User 2 at step 698.

Figure 7A:
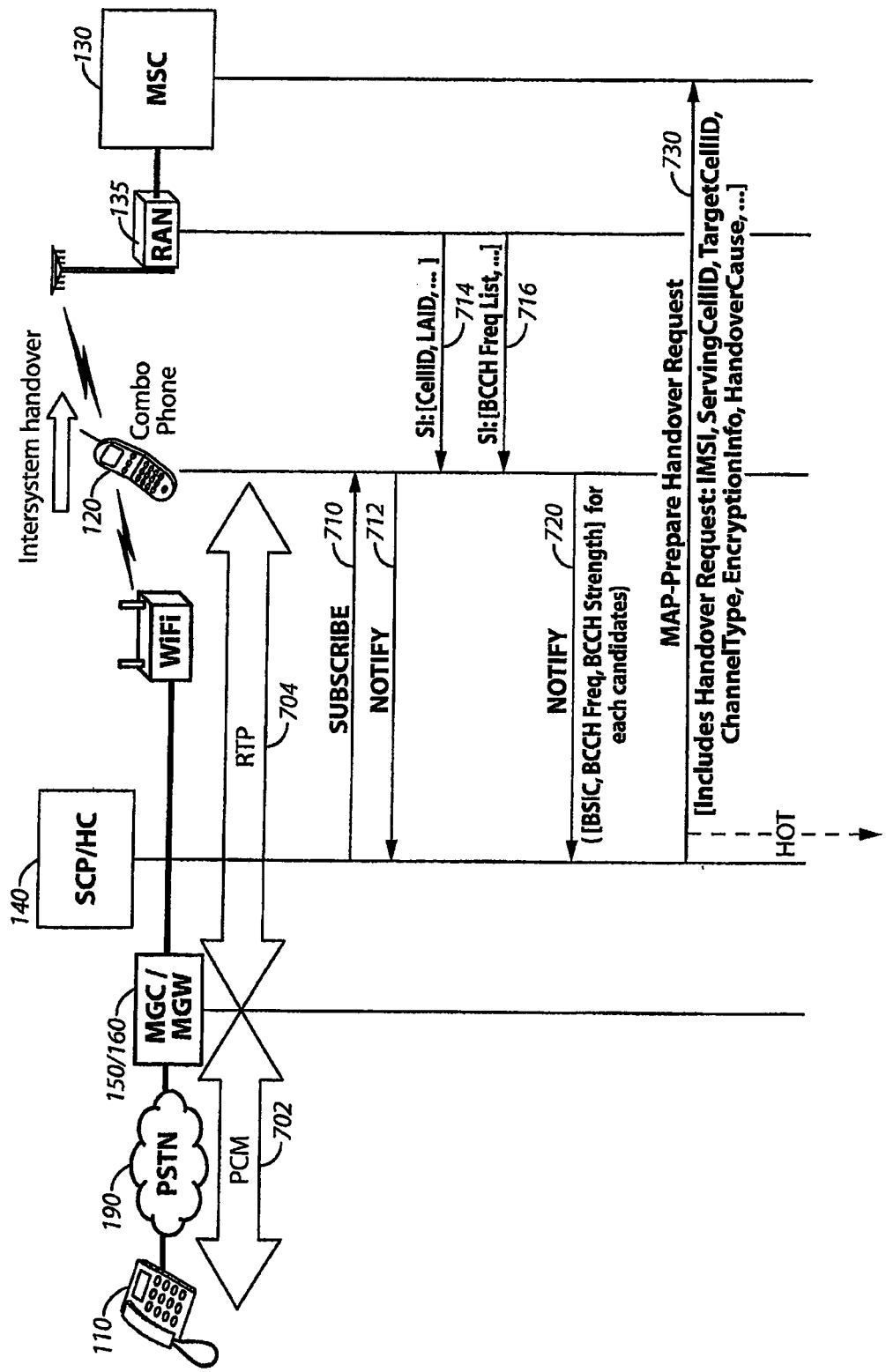
FIGS. 7A-C are diagrams depicting handoff flow wherein the mobile handset transitions from the IP domain to a GSM based cellular domain while the other user remains fixed.

The above handoff flows are used in systems in which the users are operating mobile handsets in a CDMA-based cellular network. FIGS. 7A-C and 8A-C depict the handoff flow for the transition of a mobile user using a "combo-phone" in both IP and GSM-based cellular networks. In FIG. 7A User 1 110 is the fixed user connected to the network through the PSTN or a GSM based cellular network. User 2 120 is originally connected via an IP domain WiFi access point and is transitioning to a non-IP based GSM network. The original call consists of a PCM based session 702 between fixed User 1 and the MGW through the PSTN while User 2 is connected via an RTP session 704 between the mobile handset of User 2 through the WiFi access point and the MGW. The handover process begins when the handover controller implemented in SCP 140 which at step 710 sends a SIP SUBSCRIBE message to User 2 requesting the mobile handset of User 2 to send notification if certain predetermined handover conditions are met. The mobile handset of User 2 sends a SIP NOTIFY message back to the SCP 140 at step 712 acknowledging receipt of the instruction. The mobile handset of User 2 obtains GSM neighbor information and gathers GSM signal measurement information from BCCH ("Broadcast Control Channel") signals using SI commands SI:[CellID, LAID . . . ] 714 and SI:[BCCH Freq List, . . . ] 716. Once the mobile handset of User 2 detects the predetermined handover condition the mobile handset sends a SIP NOTIFY message to the SCP 140 at step 720 including the BSIC ("Base Station Identity Code"), BCCH Frequency, BCCH Strength for each candidate GSM cellular base station.

Figure 7B:
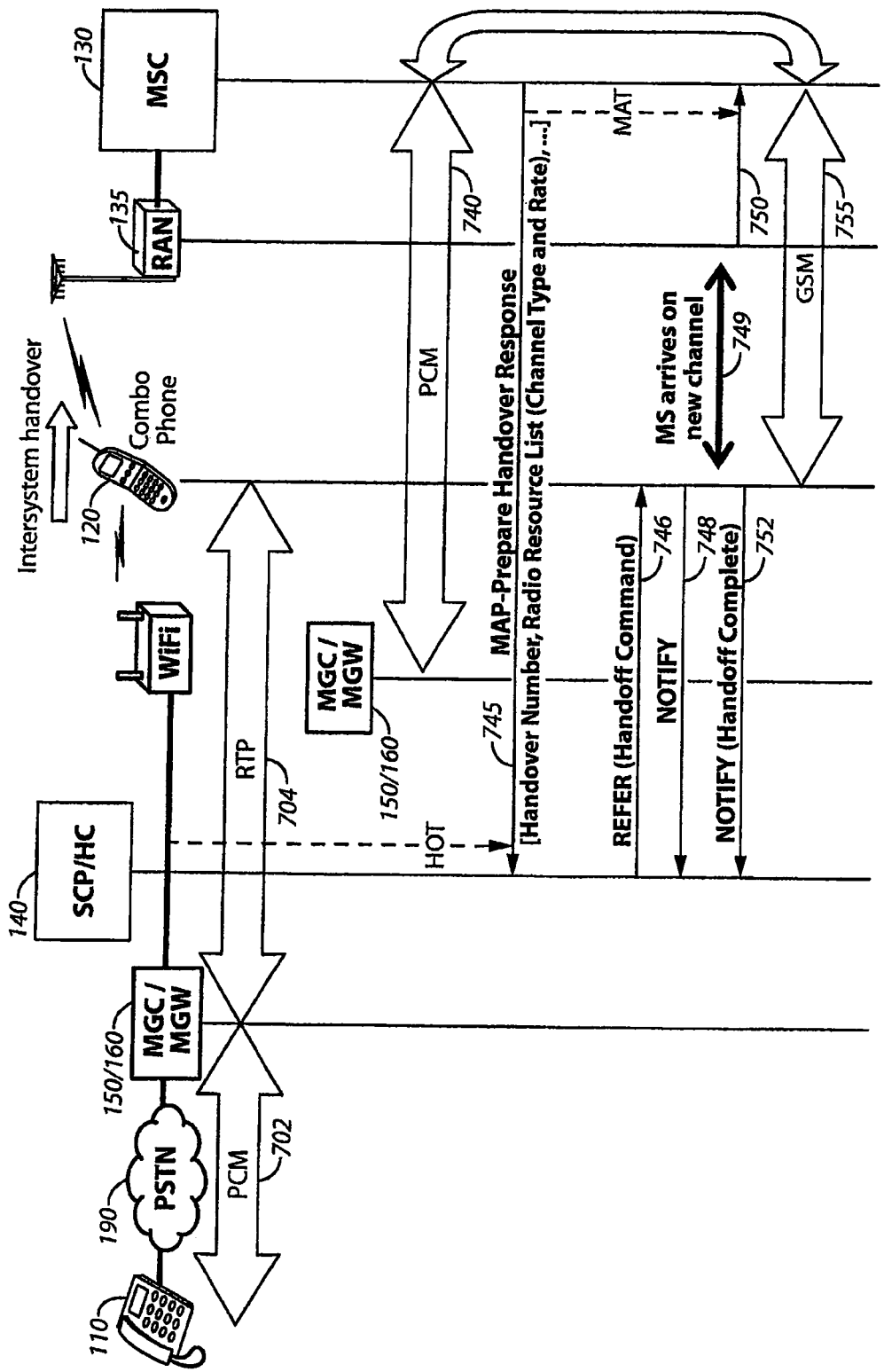

Using the information from the SIP NOTIFY message send at step 720 the handover controller implemented in the SCP uses candidate information to select a target CellID, uses cellID to determine the target MSCID and determines the idle circuited to target MSCID. The SCP 140 then sends a MAP-Prepare Handover Request message at step 730 to the target MSC for the selected cell that includes the IMSI ("International Mobile Subscriber Identity"); ServingCellID; Target-CellID; Channel Type; EncryptionInfo; HandoverCause, . . . 1. Referring to FIG. 7B, the target MSC then begins communicating with the MGW in which it is in communication in a PCM based session at 740. The target MSC then sends a MAP-Prepare Handover Response message back to the SCP 140 at step 745 that includes the handover number, radio resource list (channel type and rate), . . . ]. The SCP then sends a SIP REFER command to the mobile handset of User 2 at step 746 providing the handoff command to the device. At step 748 the mobile handset of User 2 responds to the SCP with a SIP NOTIFY message. The mobile handset then begins communicating with the base station associated with the target MSC on the new channel at 749/750. The mobile handset then sends a SIP NOTIFY message to the SCP 140 notifying the SCP that the handoff of it from the IP domain to the non-IP domain is complete. The mobile handset of User 2 is now communicating in the GSM domain 755.

Figure 7C:
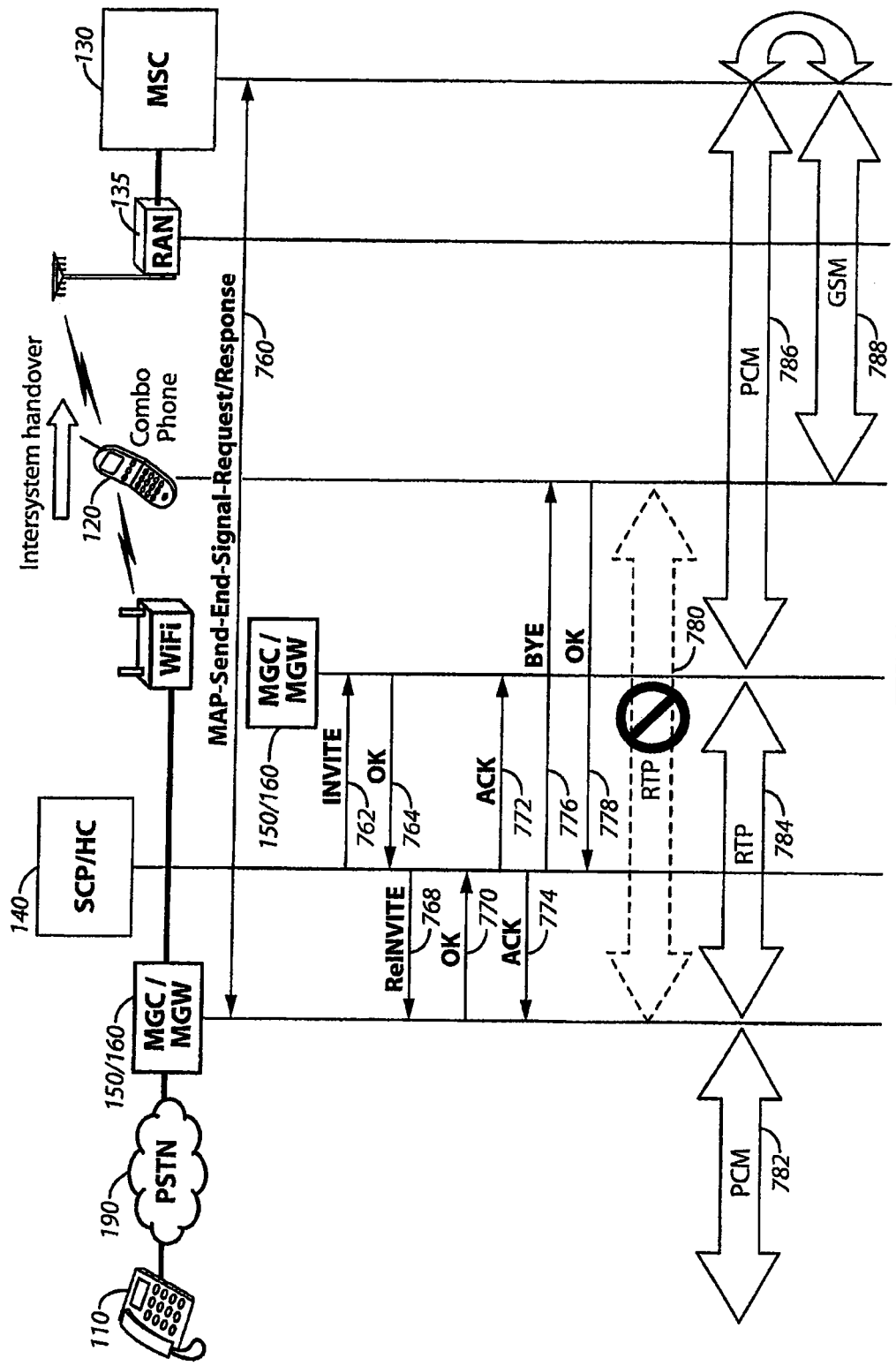

Referring to FIG. 7C, the handoff continues with the initiation of an RTP session between the MGW in communication with User 1 and the MGW in connection with User 2. A MAP-Send-End-Signal-Request/Response is sent between the target MSC communicating with the mobile handset of User 2 and the MGW in communication with User 1 at step 760. To accomplish this a SIP INVITE command it sent from the SCP 140 to the MGW in communication with User 2 at step 762 which responds with a SIP OK message back to the SCP at step 764. The SCP also sends a SIP Re-INVITE message to the MGW in communication with User 1 at step 768 which responds with a SIP OK message at step 770. SCP 140 sends SIP ACK message to both MGW's at steps 772 and 774 respectively. At step 776 the SCP 140 releases the mobile handset with a SIP BYE message and the mobile handset responds with a SIP OK message at step 778. Thus, the RTP session 780 between the mobile handset of User 2 and the MGW in communication with User 1 is terminated and an RTP session 784 between the two media gateways has been established. Call flow now exists from User 1 over a PCM based session with its MGW at 782 continuing through an RTP session between the respective MGWs at 784. Call flow continues from the MGW to the target MSC through PCM based session 786 and then from the target MSC to the mobile handset of User 2 using GSM based session 788. Handoff is complete and the call continues through this pathway.

Figure 8A:
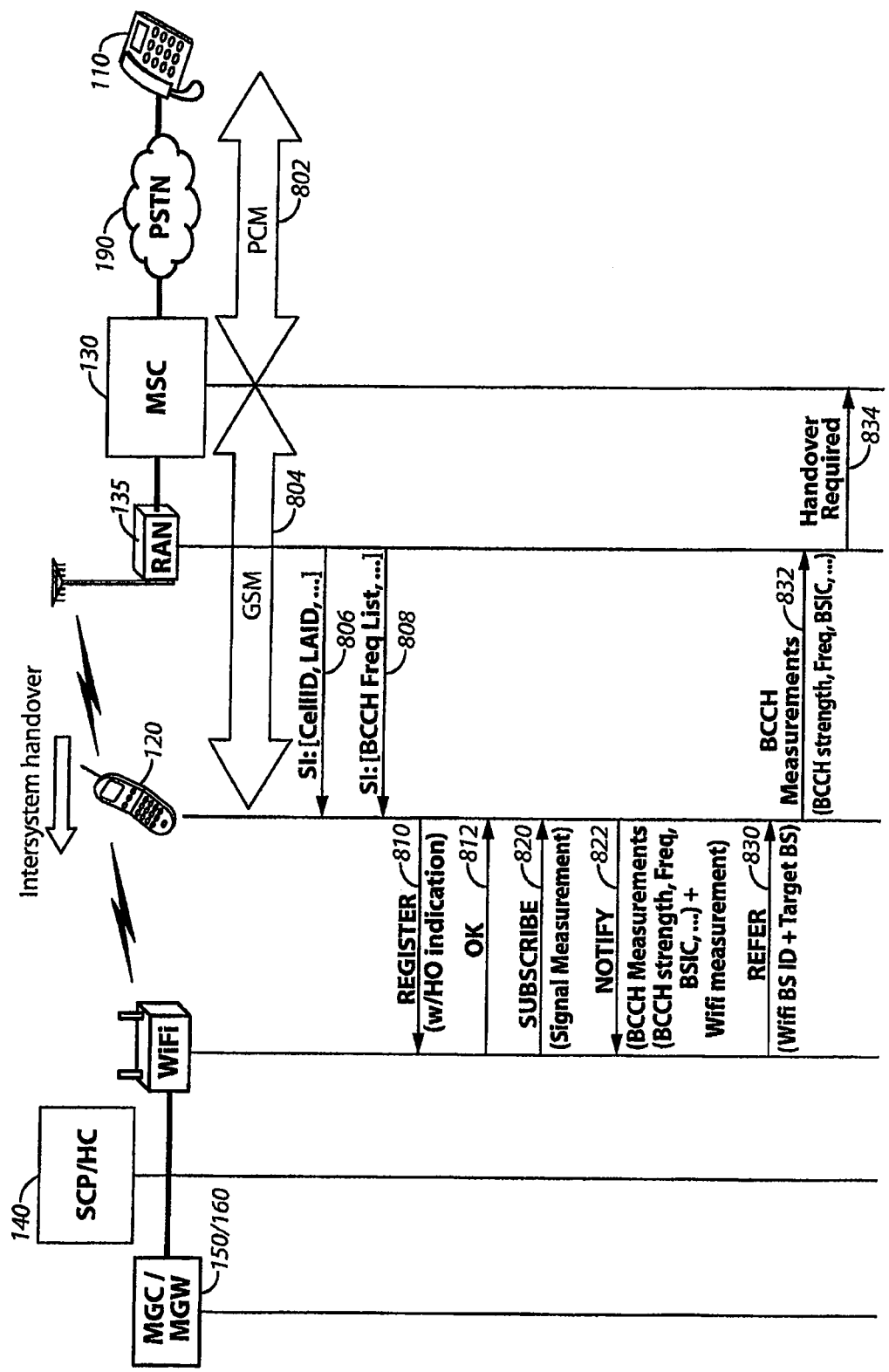
FIGS. 8A-C are diagrams depicting handoff flow wherein the mobile handset transitions from a GSM based cellular domain to an IP domain while the other user remains fixed.

Referring to FIG. 8A, User 1 is connected to the PSTN which through a PCM based call session 802. The PSTN is connected to the serving MSC for the mobile handset of User 2 which is in communication with the handset through a standard GSM based session 804. User 2 is likely to transition from the GSM based call to an RTP based call in the IP domain by connecting to a local WiFi access point. The mobile handset of User 2 obtains GSM neighbor information and gathers GSM signal measurement information from BCCH signals using the SI:[CellID, LAID, . . . ] and SI: [BCCH Freq list, . . . ] at steps 806 and 808 respectively. At step 810 the mobile handset sends a SIP REGISTER message with handoff indication and WiFi BSSID to the SCP 140 after it has detected a WiFi access point and has established an association with the WiFi network and associated VPN or other IP network. At step 812 the SCP returns a SIP OK message to the mobile handset of User 2. At step 820 the SCP sends a SIP SUBSCRIBE message to the mobile handset requesting the mobile handset of User 2 provide information on WiFi signal measurements. At step 822 the mobile handset of User 2 sends a SIP NOTIFY message to the SCP including BCCH measurements, BCCH strength, FREQ, BSIC and WiFi measurements. The SCP 140 controller assigns WiFi BS ID that correlates to target WiFi BSSID and forwards this to the mobile handset of User 2 using a SIP REFER message at step 830. The mobile handset of User 2 then forwards the WiFi BS ID pilot strength measurements, including the WiFi BS ID as the most desirable target BS to the RAN and MSC at steps 832 and 834.

Figure 8B:
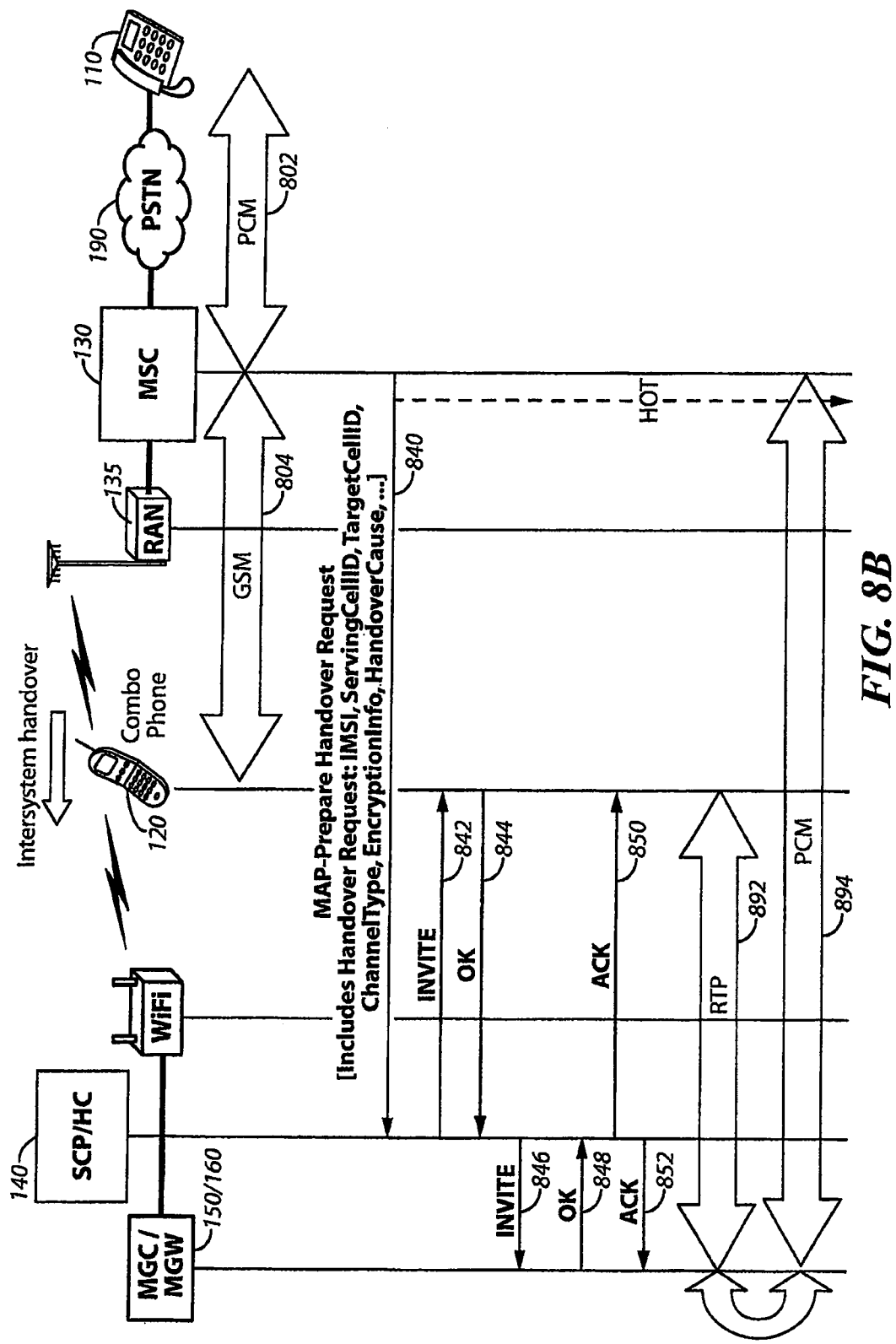

Referring to FIG. 8B, the MSC uses the information regarding the handoff candidate to select the target cellID in this case the WiFi BS ID. The MSC uses the cellID to determine the target MSC ID which in this case will be the handover controller "MSC". Additionally, the MSC determines the idle circuited to target MSCID which corresponds to the handover controller "MSC." This information is then forwarded and sent to the SCP handover controller in the form of a MAP-Prepare Handover Request message at step 840. The MAP-Prepare Handover Request message includes the Handover Request; IMSI, ServingCellID, TargetCellID, ChannelType, EncryptionInfo, Handovercause, . . . ]. At step 842 the SCP begins initiation of an RTP session between the mobile handset of User 2 and the associated MGW using a SIP INVITE message sent to the mobile handset at step 842 which responds with a SIP OK message at step 844. At step 846 the SCP sends a SIP INVITE message to the MGW which responds with a SIP OK message at step 848. SCP 140 then acknowledges initiation of the RTP session 892 with SIP ACK messages sent to the mobile handset of User 2 and the MGW at steps 850 and 852 respectively.

Figure 8C:
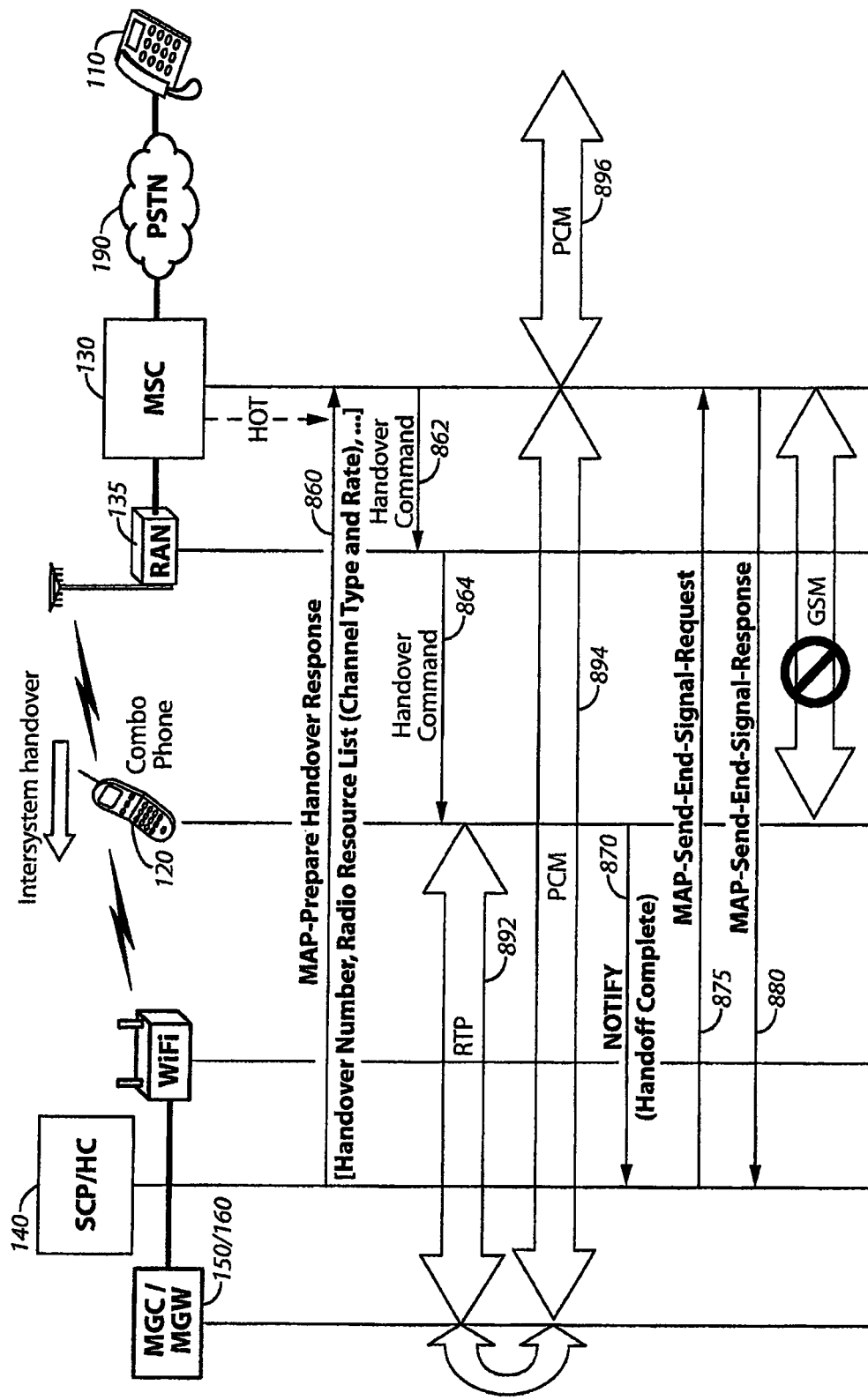

Referring to FIG. 8C, the SCP 140 sends a MAP-Prepare Handover Response message containing information including the Handover Number, the Radio Resource List (channel type and rate) to the MSC at step 860. The MSC then sends a handover command to the RAN at 862 which forwards it to the mobile handset at step 864 which then switches to the SIP session. Information now flows from the mobile handset of User 2 to the MGW via an RTP session 892. The MGW then communicates with the MSC via a PCM session 894 and the MSC communicates with User 1 via PCM through the PSTN at 896. At step 870 the mobile handset sends a SIP NOTIFY message to the SCP 140 notifying the SCP that the handoff is complete. At steps 875 and 880 the SCP and the MSC trade MAP-Send-End-Signal-Request and MAP-Send-End-Signal-Response messages to signal the completion of the handover and terminate the GSM-based session.

SCP 140 can either keep call state information or the system can be implemented so that call state information is not kept in the SCP. Handoff Controller must direct that an initial connection be transformed into a new connection in response to a handoff.

Figure 9:
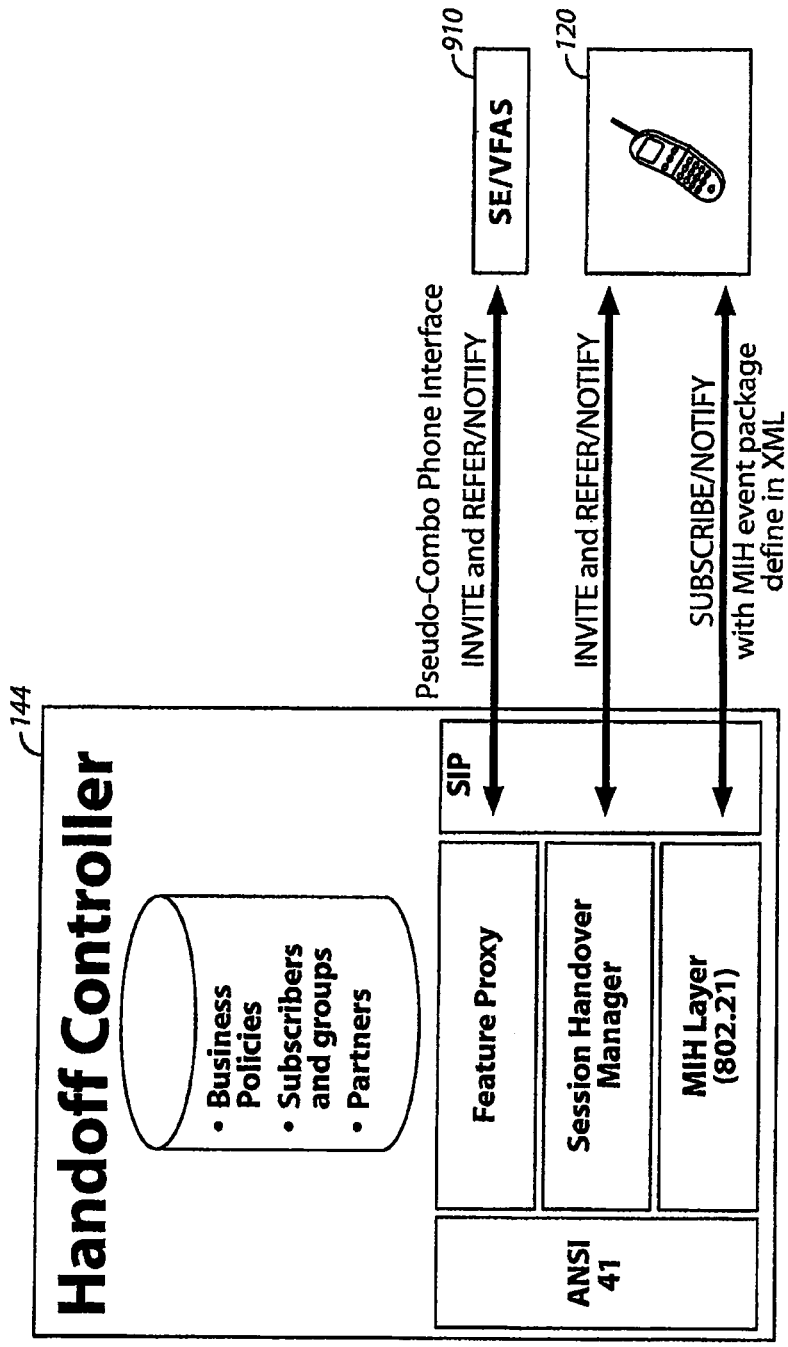
FIG. 9 is a functional diagram of the handoff controller and the SIP interface to the combo-phone mobile handset.
Figure 10:
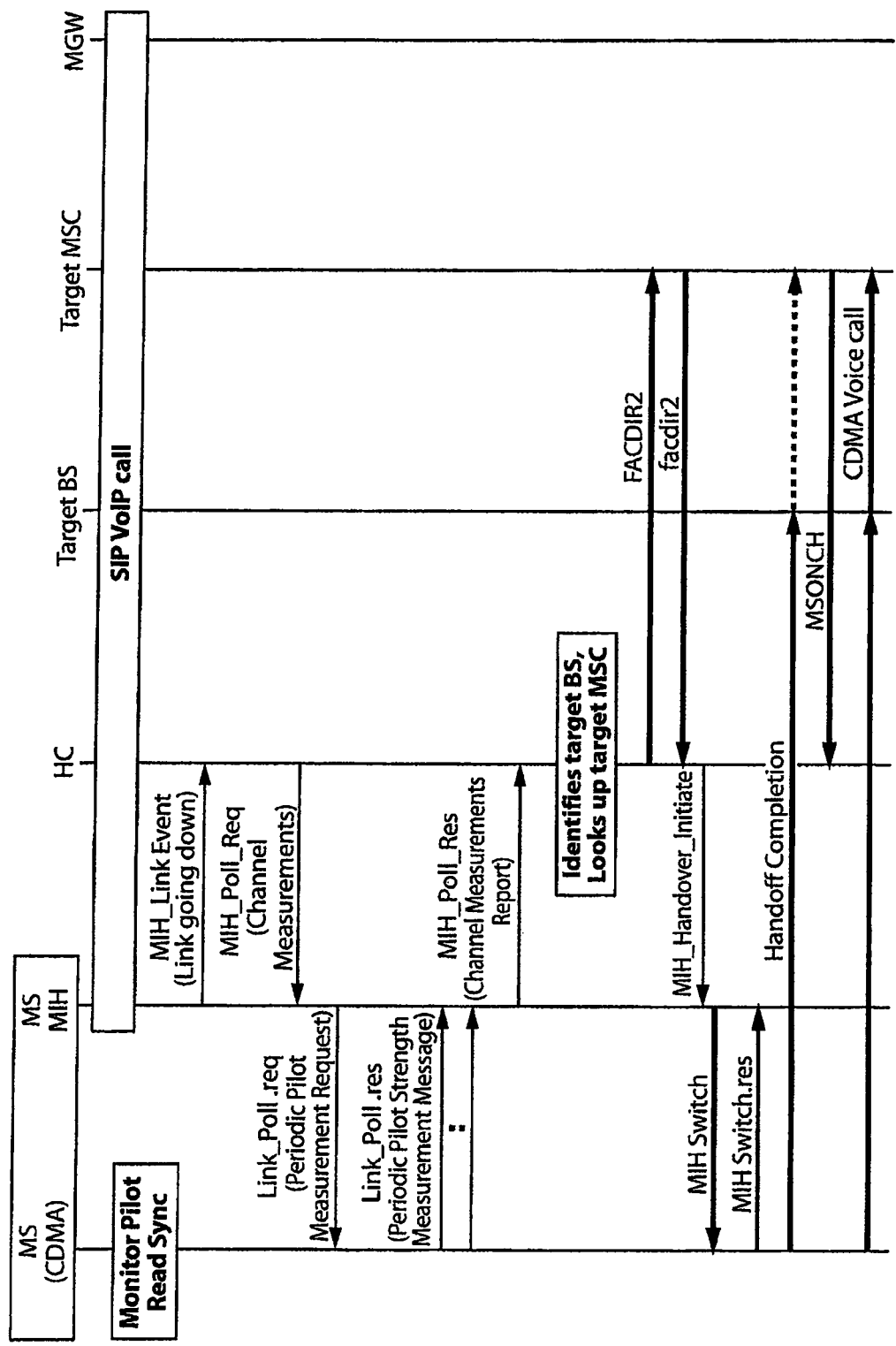
FIG. 10 is a diagram depicting the use of 802.21 primitives in the transition from the IP domain to the CDMA cellular domain.
Figure 12:
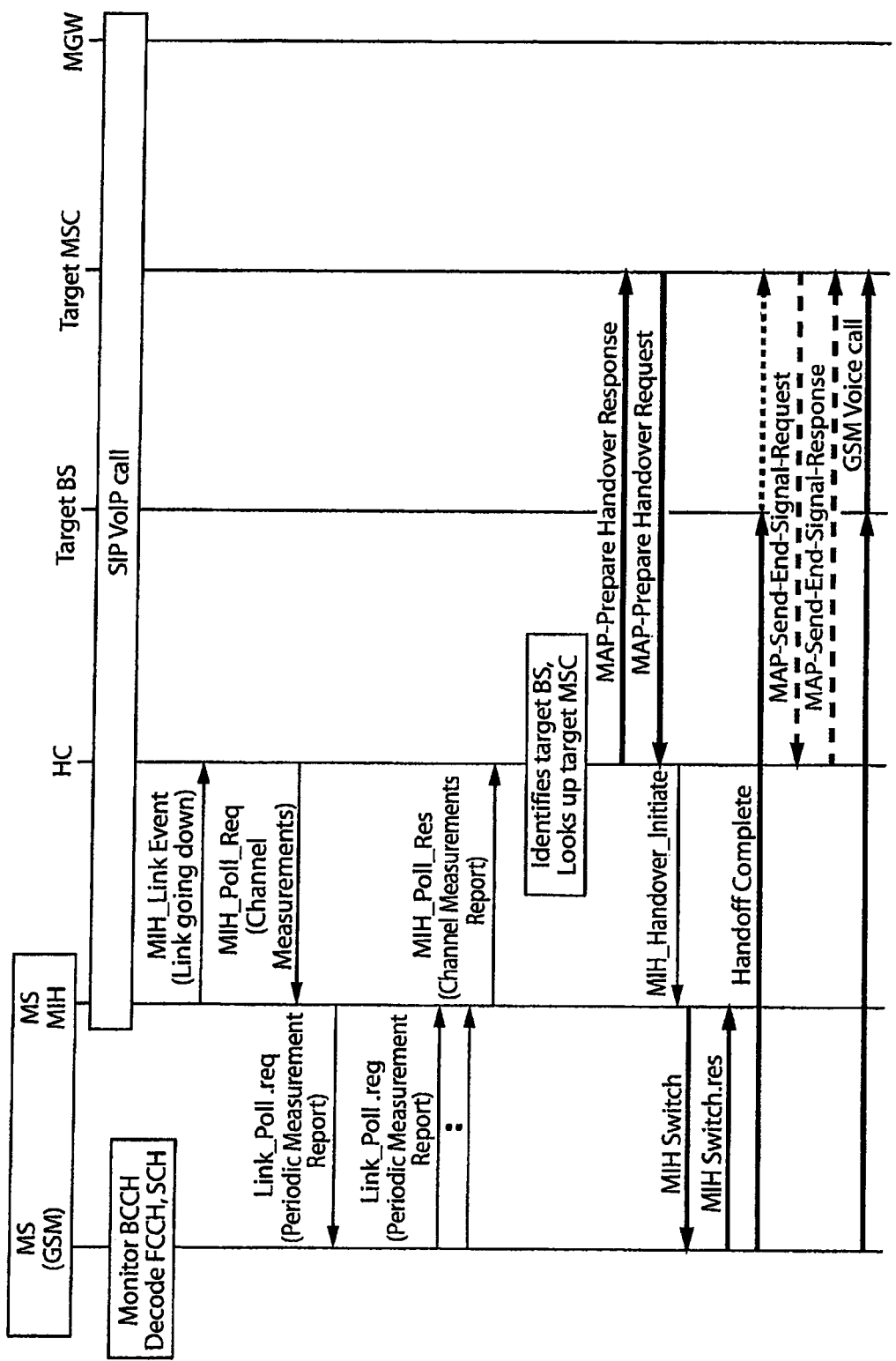
FIG. 12 is a diagram depicting the use of 802.21 primitives in the transition from the IP domain to the GSM cellular domain.
Figure 13:
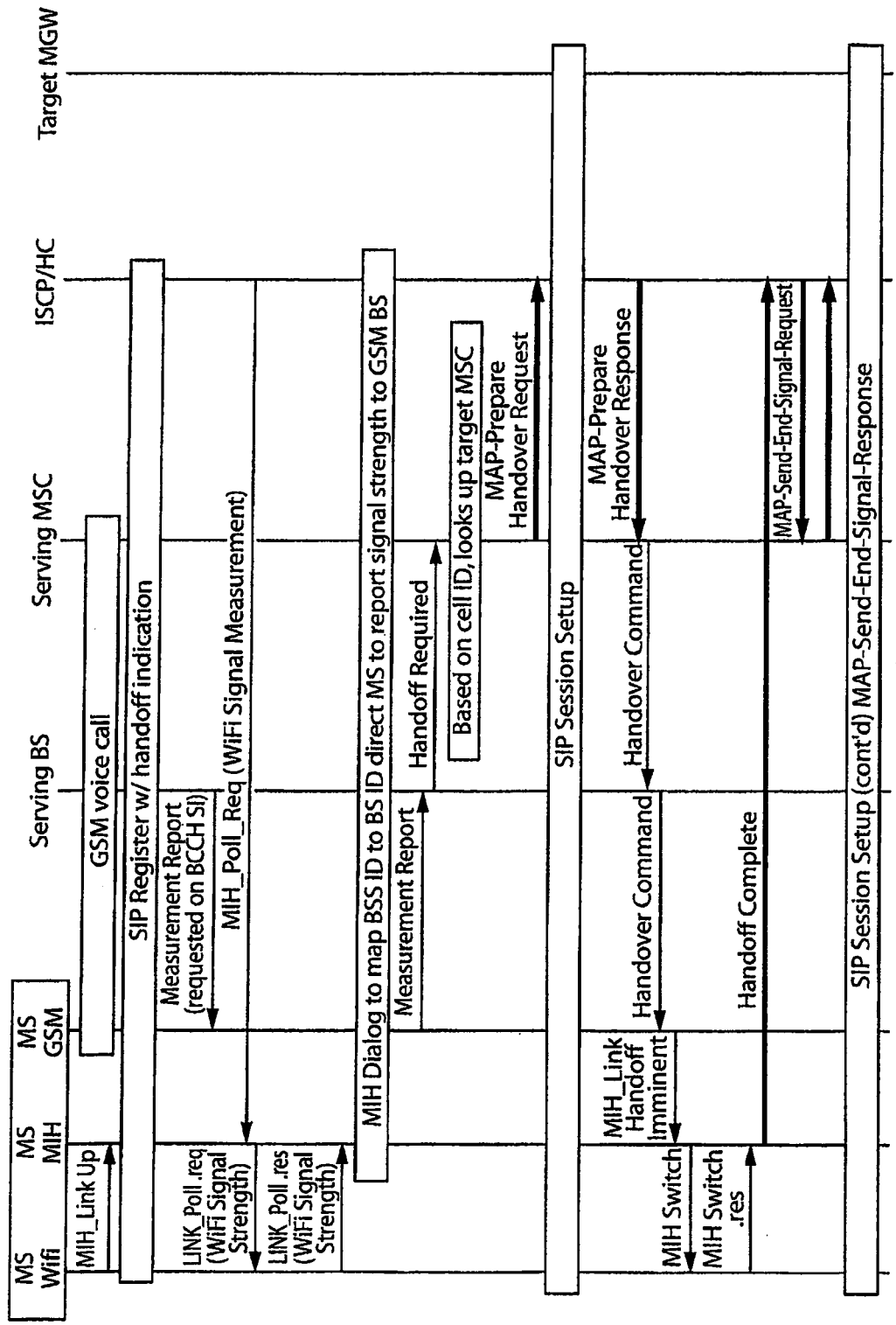
FIG. 13 is a diagram depicting the use of 802.21 primitives in the transition from the GSM cellular domain to the IP domain.

FIG. 9 depicts the handoff controller and its SIP interfaced to the mobile handset 120. SE/VFAS 910 is Voice Feature Application Server that is part of ISCP. The handoff controller 144 resides in the SCP 140 and executes media-independent policies and business rules in order to determine the appropriate time for handoff. The handoff controller adapts between various protocols and access technology requirements and interacts with legacy infrastructure such as GSM or CDMA. Handoff controller 144 is also able to generate usage records for billing purposes. The handoff controller comprises an ANSI-41 interface, a SIP interface and three internal layers: the feature proxy, the session handover manager and the MIH Layer (IEEE 802.21). In the mobile handset there is also an MIH layer and two radio interfaces—either CDMA or GSM and WiFi or WiMAX. The mobile handset should be capable of monitoring both wireless networks. It must also be capable of sending events to the Handoff Controller. The mobile handset can request handovers and may also provide for user input to "force" a handover. The MIH layer implements the use of 802.21 primitives in SIP messages as further described in FIGS. 10 and 11 for CDMA implementations and in FIGS. 12 and 13 for GSM implementations.

ANSI-41 is used to support the handoff from CDMA to WiFi/WiMAX and vice versa. ANSI-41 messages provide coordination of cell identification between neighboring MSCs. ANSI-41 messages use Serving/Target cell identifiers (IDs) to coordinate handoff. ServingCellID and TargetCellID used in FacilitiesDirective2, HandoffBack2, HandoffToThird2 INVOKE.

ANSI-41 also provides coordination of inter-MSC facility identification between neighboring MSCs. ANSI-41 assumes dedicated trunks for intersystem handoff. ANSI-41 messages use Circuit IDs to coordinate handoff. InterMSCCircuit is used in FacilitiesDirective2, HandoffBack2, HandoffToThird2 INVOKE. Dedicated trunks are required between Media Gateway (MGW) and Serving MSC and Target MSC for proper handoff. There is a need to maintain trunk status information to assign available trunk circuit for handoff. ANSI-41 defines Blocking, Unblocking, ResetCircuit, TrunkTest, and TrunkTestDisconnect operations for inter-MSC circuit management.

ANSI-41 operations used in a handoff forward are: HandoffMeasurementRequest(2); FacilityDirective(2); MSCOnChannel; and InterSystemAnswer. HandoffMeasurementRequest(2) is sent from the serving MSC to the candidate MSC to request measurement data regarding signal quality level of any specific channel. FacilityDirective (2) is sent from the serving MSC to the Target MSC to request handoff forward. The FacilityDirective(2) ("'FACDIR2'") message contains a number of mandatory parameters: MIN based on known MS information; ESN based on known MS information; BillingID which is populated based on the BillingID assigned to the current call (potential Segment Count increment); InterMSCCircuitID which the HC selects an idle circuit between itself and the target MSC; InterSwitchCount which the HC calculates (i.e., set to 1 if anchor MSC, else increments prior value); ServingCellID which is the ID of the current cell in the serving MSC. This parameter may be used by the target MSC as the mechanism to determine which MSC is currently serving the MS. Based on the above, the HC can populate a common (pre-defined) value for the ServingCellID whenever it invokes handoff procedures. This specific value needs to be configured in all potential target MSCs and used to map back to the "MSC" as provided by the SCP/HC.

The FacilityDirective(2) message contains a number of optional parameters. CDMA-based procedures for handoff support the following parameters. HandoffReason indicates the reasons for the handoff. HandoffState indicates that MS is currently involved in a call that is in an "awaiting answer" or "alerting state" and supports ISAnswer treatment. ConfidentialityModes indicates status of Voice Privacy and Signaling Message Encryption features and whether these features are desired after handoff. SignalMessageEncryptionKey included for Voice Privacy and Signaling Message Encryption features, CDMACallMode indicates what channel types are acceptable (CDMA, AMPS and/or NAMPS). CDMA ChannelData provides information related to the current CDMA traffic channel that is in use (frame offset, channel number, band class, long code mask). CDMAMobileProtocolRevision is based on "CDMA MOB_P_REV" information. CDMAPrivateLongCodeMask is used in conjunction with the Voice Privacy feature. CDMAServingOneWayDelay is the estimated one-way delay from MS to serving BS in units of 100 nanoseconds and is convertible to an estimated distance. CDMAStationClassmark includes MS power class, analog transmission, slotted mode indicator and dual-mode indicators. CDMATargetMAHOList is included for mobile-assisted HO and provides a set of TargetCellID/CDMAPilot-Strength/CDMATargetOneWayDelay information. CDMA-TargetMeasurementList is included if MAHO is not used and provides a set of TargetCellIP/CDMAPilotStrength/CDMA-TargetOneWayDelay information. MSLocation provides the latitude and longitude resolution information for the MS.

MSCOnChannel is sent from the Target MSC to the Serving MSC to indicate that the Mobile Handset was detected on the new channel. InterSystemAnswer is sent from the target MSC to the serving MSC to indicate that the MS-terminated call was answered. In addition the InterSystem Answer command is also sent from the serving MSC to the Target MSC to indicate that the MSC-originated call was answered.

With regard to handoff backward and path minimization the following ANSI-41 operations are used. HandoffBack(2) is sent from the serving MSC to the target MSC to request that a call be handed back to the target MSC. The FacilitiesRelease operation is sent from the target MSC to the serving MSC to request that allocated resources for a call segment be released. The HandOffToThird(2) operation is sent from the serving MSC to the anchor MSC to request path minimization.

Other ANSI-41 Operations that have applicability to the present invention include the AuthenticationDirectiveForward, InformationForward, FlashRequest, SMSDeliveryBackward, SMSDeliveryForward, IntersystemPage(2) and IntersystemSetup. The AuthenticationDirectiveForward operation supports unique challenges (post-handoff) sent from the anchor MSC to the serving MSC. The InformationForward operation allows the MWN or CE alert to be passed down the handoff chain from the anchor MSC to the serving MSC. The FlashRequest operation allows a flash indication to be sent from the serving MSC to the anchor MSD. The SMS-DeliveryBackward and SMSDeliveryForward operations support SMS origination and termination under handoff conditions. The IntersystemPage(2) and InterSystemSetup operations support call delivery in border cell situations.

In ANSI-41, mid-call features that are invoked when a call has been handed-off are handled by the Anchor MSC, not the new serving MSC. In ANSI-41, a FLASHREQ command is used to pass information regarding mid-call events from the serving MSC to the anchor MSC.

When a call is handed off from WiFi to CDMA, the mobile handset operates as normal in CDMA mode and the MSC sends a FLASHREQ to the Handover Controller. The Handover Controller implements a pseudo-combo phone SIP interface and translates the received flash request into appropriate SIP signaling messages, i.e., flash hook causes the Handover Controller to put the call on hold using Third Party Call Control ("3PCC") signaling to the MGC and the remote party.

When a call is handed off from CDMA to WiFi/WiMAX, then the handset must emulate the CDMA operation. Specifically, when the handset is in the "handoff mode", the Handover Controller will invoke the SUBSCRIBE/NOTIFY with Key Press Markup Language ("KPML") event package to monitor the handset for flash hook with digits dialed. The mobile handset will deliver flash requests using NOTIFY rather than actually attempting to implement the feature as in "normal mode". Handover Controller will receive NOTIFY and translate the received signals into FLASHREQ and send to them to the anchor MSC.

Mobile Handset 120 should have the following capabilities. Mobile Handset supports MIH to interact with two radio layers (Layer1 and Layer2). Mobile Handset should measure the pilots and report measurement to MIH rather than transmitting. Mobile Handset should establish a virtual private network (VPN) to exchange SUP signaling while on a CDMA call. When receiving the Handoff message though MIH, it should move to a normal state of transmission. When forcing a hard handoff from CDMA to WiFi the mobile Handset should be able to support the SUBSCRIBE/NOTIFY mechanism required by the MIES. For feature operation the Mobile Handset should be able to support a "handoff mode" of operation for Registration and Feature Operation.

The above-described embodiments of the invention are intended to be illustrative only. Numerous other embodiments may be devised by those skilled in the art without departing from the spirit and scope of the invention.

We claim:

1. A method for using a handoff controller for handing off a communication session of a first communication device from a first network to a second network, wherein the first network is one of an Internet Protocol (IP) network and a cellular network and the second network is a different one of the IP network and the cellular network as compared to the first network, and wherein the first communication device is in communication with a second communication device, the method comprising:

sending a Session Initiation Protocol (SIP) message from the handoff controller to the first communication device instructing the first communication device to monitor at least one predetermined characteristic of an interface between the first communication device and the first network;

receiving at the handoff controller an SIP message from the first communication device when a value associated with the at least one predetermined characteristic has been met to provide a received SIP message;

receiving at the handoff controller network information regarding available connection points in the second network;

determining in the handoff controller, based on the received SIP message and the network information, one of the available connection points in the second network to which the first communication device shall be connected;

sending a further SIP message from the handoff controller to the first communication device identifying the one of the available connection points in the second network; and effecting, by the handoff controller, a seamless handoff of the first communication device from the first network to the second network via the identified one of the available connection points so as to allow continued communication between the first communication device and the second communication device;

wherein the SIP messages contain non-SIP service primitives pertaining to handover capabilities, with the handoff controller performing the steps as a function, at least in part, of the service primitives.

2. The method for using a handoff controller as claimed in claim 1, wherein the handoff controller is configured to utilize an 802.21 MIH layer to process 802.21 MIHF service primitives.

3. The method for using a handoff controller as claimed in claim 1, wherein the service primitives are independent of protocols and access technologies associated with IP networks and cellular networks and IP components and cellular components.

4. The method for using a handoff controller as claimed in claim 1, wherein effecting a seamless handoff includes establishing a Real-time Transport Protocol (RTP) session through SIP messaging.

5. The method for using a handoff controller as claimed in claim 1, wherein the first communication device is capable of operating in both the IP network and the cellular network.

6. The method for using a handoff controller as claimed in claim 1, wherein the cellular network is one of a Code Division Multiple Access (CDMA) network and a Global System for Mobile Communications (GSM) network.

7. The method for using a handoff controller as claimed in claim 1, wherein the handoff controller resides in a Service Control Point (SCP).

8. The method for using a handoff controller as claimed in claim 1, further comprising generating usage records, via the handoff controller, for the first communication device regarding transition of the first communication device between networks for billing purposes.

9. A method for using a first communication device in connection with a handoff of a communication session of the first communication device from a first network to a second network, wherein the first network is one of an Internet Protocol (IP) network and a cellular network and the second network is a different one of the IP network and the cellular network as compared to the first network, and wherein the first communication device is in communication with a second communication device, the method comprising:

receiving at the first communication device a Session Initiation Protocol (SIP) message from a handoff controller instructing the first communication device to monitor at least one predetermined characteristic of an interface between the first communication device and the first network;

sending an SIP message from the first communication device to the handoff controller when a value associated with the at least one predetermined characteristic has been met;

receiving at the first communication device a further STP message from the handoff controller identifying one available connection point in the second network, wherein the identified one available connection point is determined by the handoff controller based on the STP message and additional network information the handoff controller receives which contain information regarding available connection points in the second network; and effecting, through the first communication device, a seamless handoff of the first communication device from the first network to the second network via the identified one of the available connection points so as to allow continued communication between the first communication device and the second communication device; and wherein the SIP messages contain non-SIP service primitives pertaining to handover capabilities, with the first communication device performing the steps as a function, at least in part, of the service primitives.

10. The method for using a first communication device as claimed in claim 9, wherein the first communication device supports use of 802.21 MIHF service primitives.

11. The method for using a first communication device as claimed in claim 9, wherein the service primitives are independent of protocols and access technologies associated with IP networks and cellular networks and IP components and cellular components.

12. The method for using a first communication device as claimed in claim 9, wherein effecting a seamless handoff includes establishing a Real-time Transport Protocol (RTP) session through SIP messaging.

13. The method for using a first communication device as claimed in claim 9, wherein the first communication device is capable of operating in both the IP network and the cellular network.

14. The method for using a first communication device as claimed in claim 9, wherein the cellular network is one of a Code Division Multiple Access (CDMA) network and a Global System for Mobile Communications (GSM) network.

15. An apparatus comprising a handoff controller for handing off a communication session of a first communication device from a first network to a second network, wherein the first network is one of an Internet Protocol (IP) network and a cellular network and the second network is a different one of the IP network and the cellular network as compared to the first network, and wherein the first communication device is in communication with a second communication device, the handoff controller comprising:

a Session Initiation Protocol (SIP) interface configured to send and receive SIP messages;

a handover processing part configured to process non-SIP service primitives that pertain to handover capabilities; and a session handover manager configured to effect the handing off of the communication session of the first communication device from the first network to the second network by:

sending an SIP message to the first communication device instructing the first communication device to monitor at least one predetermined characteristic of an interface between the first communication device and the first network;

receiving an SIP message from the first communication device when a value associated with the at least one predetermined characteristic has been met to provide a received SIP message;

receiving network information regarding available connection points in the second network;

determining, based on the received SIP message and the network information, one of the available connection points in the second network to which the first communication device shall be connected;

sending a further SIP message to the first communication device identifying the one of the available connection points in the second network; and effecting a seamless handoff of the first communication device from the first network to the second network via the identified one of the available connection points so as to allow continued communication between the first communication device and the second communication device;

wherein the SIP messages contain non-SIP service primitives pertaining to handover capabilities, with the session handover manager performing, at least in part, as a function of the service primitives.

16. The apparatus comprising a handoff controller as claimed in claim 15, wherein the service primitives are independent of protocols and access technologies associated with IP networks and cellular networks and IP components and cellular components.

17. The apparatus comprising a handoff controller as claimed in claim 15, wherein effecting a seamless handoff includes establishing a Real-time Transport Protocol (RTP) session through SIP messaging.

18. The apparatus comprising a handoff controller as claimed in claim 15, wherein the cellular network is one of a Code Division Multiple Access (CDMA) network and a Global System for Mobile Communications (GSM) network.

19. The apparatus comprising a handoff controller as claimed in claim 15, wherein the handoff controller resides in a Service Control Point (SCP).

20. The apparatus comprising a handoff controller as claimed in claim 15, wherein the handoff controller may be configured to generate usage records for the first communication device regarding transition of the first communication device between networks for billing purposes.

21. A tangible computer-readable medium having stored thereon computer-executable instructions that, if executed by a computing device, cause the computing device to perform a method for handing off a communication session of a first communication device from a first network to a second network, wherein the first network is one of an Internet Protocol (IP) network and a cellular network and the second network is a different one of the IP network and the cellular network as compared to the first network, and wherein the first communication device is in communication with a second communication device, the method comprising:

sending a Session Initiation Protocol (SIP) message from the computing device to the first communication device instructing the first communication device to monitor at least one predetermined characteristic of an interface between the first communication device and the first network;

receiving at the computing device an SIP message from the first communication device when a value associated with the at least one predetermined characteristic has been met to provide a received SIP message;

receiving at the computing device network information regarding available connection points in the second network;

determining in the computing device, based on the received SIP message and the network information, one of the available connection points in the second network to which the first communication device shall be connected;

sending a further SIP message from the computing device to the first communication device identifying the one of the available connection points in the second network; and effecting, by the computing device, a seamless handoff of the first communication device from the first network to the second network via the identified one of the available connection points so as to allow continued communication between the first communication device and the second communication device;

wherein the SIP messages contain non-SIP service primitives pertaining to handover capabilities, with the computing device performing the steps as a function, at least in part, of the service primitives.

22. The tangible computer-readable medium as claimed in claim 21, wherein the computing device is configured to utilize an 802.21 MIH layer to process 802.21 MIHF service primitives.

23. The tangible computer-readable medium as claimed in claim 21, wherein the service primitives are independent of protocols and access technologies associated with IP networks and cellular networks and IP components and cellular components.

24. The tangible computer-readable medium as claimed in claim 21, wherein effecting a seamless handoff includes establishing a Real-time Transport Protocol (RTP) session through SIP messaging.

25. The tangible computer-readable medium as claimed in claim 21, wherein the first communication device is capable of operating in both the IP network and the cellular network.

26. The tangible computer-readable medium as claimed in claim 21, wherein the cellular network is one of a Code Division Multiple Access (CDMA) network and a Global System for Mobile Communications (GSM) network.

27. The tangible computer-readable medium as claimed in claim 21, wherein the computing device resides in a Service Control Point (SCP).

28. The tangible computer-readable medium as claimed in claim 21, further comprising instructions that, if executed by the computing device, cause the computing device to perform generating usage records for the first communication device regarding transition of the first communication device between networks for billing purposes.

* * * * *

UNITED STATES PATENT AND TRADEMARK OFFICE
CERTIFICATE OF CORRECTION

PATENT NO. : 8,442,005 B2
APPLICATION NO. : 12/638765
DATED : May 14, 2013
INVENTOR(S) : Dutta et al.

It is certified that error appears in the above-identified patent and that said Letters Patent is hereby corrected as shown below:

In the Drawings

Fig. 1, Drawing Sheet 1 of 19, delete "SPC" and insert -- SCP --, therefor.

Figure 11:
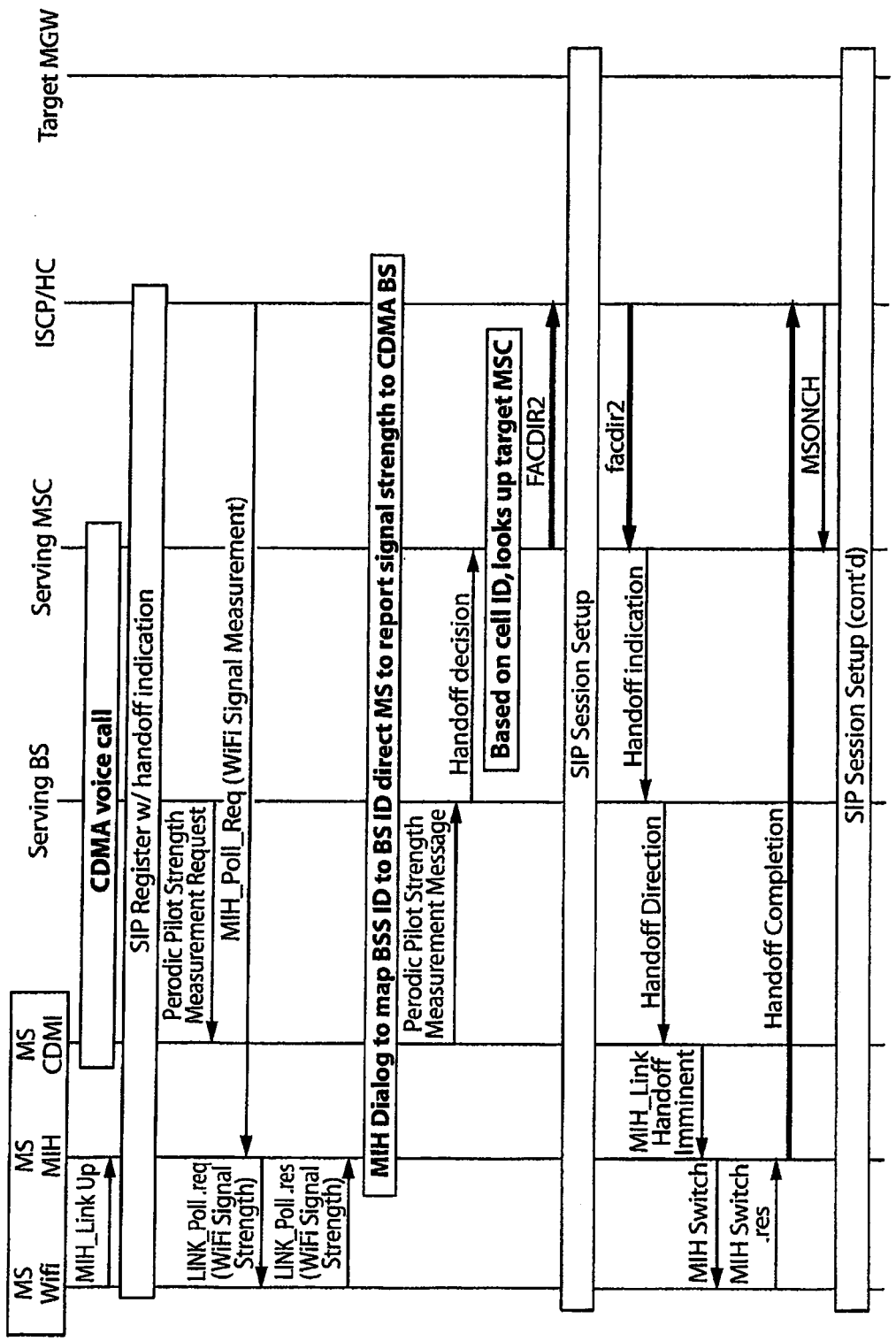
FIG. 11 is a diagram depicting the use of 802.21 primitives in the transition from the CDMA cellular domain to the IP domain.

Fig. 11, Drawings Sheet 17 of 19, delete " 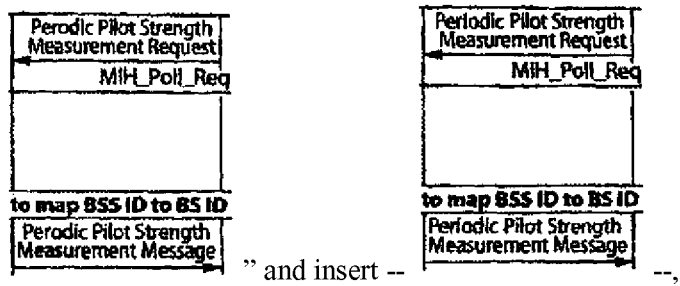 " and insert -- --, therefor.

In the Specification

Column 6, Lines 20-31, delete "Media Gateway ....... other protocol." and insert the same at Line 19, after "through the" as a continuation paragraph.

Column 6, Line 20, delete "("MGW") 120" and insert -- ("MGW") 150 --, therefor.

Column 10, Lines 25-26, delete "HandoverCause, . . . 1." and insert -- HandoverCause, . . . . etc. --, therefor.

Column 10, Line 31, delete "rate), . . . ]." and insert -- rate), . . . . etc. --, therefor.

Column 10, Line 51, delete "Re-INVITE" and insert -- ReINVITE --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,442,005 B2

Column 11, Line 42, delete "Handovercause, . . . ]." and insert -- HandoverCause, . . . . etc. --, therefor.

Column 13, Line 15, delete "ChannelData" and insert -- ChannelData --, therefor.

In the Claims

Column 15, Line 62, in Claim 9, delete "STP" and insert -- SIP --, therefor.

Column 15, Line 66, in Claim 9, delete "STP" and insert -- SIP --, therefor.